US012743190B2

(12) United States Patent
Jung et al.

(10) Patent No.: US 12,743,190 B2
(45) Date of Patent: Sep. 22, 2026

(54) DEVICE AND METHOD FOR PROVIDING GUIDANCE FOR RECIPE

(71) Applicant: SAMSUNG ELECTRONICS CO., LTD., Suwon-si (KR)

(72) Inventors: Hoichul Jung, Suwon-si (KR); Soonil Lim, Suwon-si (KR); Sunghwan Choi, Suwon-si (KR); Seunghyun Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 18/680,283

(22) Filed: May 31, 2024

(65) Prior Publication Data

US 2024/0319849 A1 Sep. 26, 2024

Related U.S. Application Data

(63) Continuation of application No. PCT/KR2022/021600, filed on Dec. 29, 2022.

(30) Foreign Application Priority Data

Jan. 10, 2022 (KR) ........................ 10-2022-0003621

(51) Int. Cl.
*G06F 3/0482* (2013.01)
*A47J 36/32* (2006.01)
*G06F 3/04847* (2022.01)

(52) U.S. Cl.
CPC .......... *G06F 3/0482* (2013.01); *A47J 36/321* (2018.08); *G06F 3/04847* (2013.01)

(58) Field of Classification Search
CPC ..................................................... G06F 3/0482
(Continued)

(56) References Cited

U.S. PATENT DOCUMENTS 8,419,433 B2 * 4/2013 Do ...................... G06F 16/9535 219/385
8,419,434 B2 * 4/2013 Do ...................... G09B 21/003 219/385

(Continued)

FOREIGN PATENT DOCUMENTS

JP 2002-251518 9/2002
JP 2006-146349 6/2006

(Continued)

OTHER PUBLICATIONS

International Search Report dated Apr. 3, 2023 issued in PCT Application No. PCT/KR2022/021600.

(Continued)

*Primary Examiner* — Reza Nabi
(74) *Attorney, Agent, or Firm* — STAAS & HALSEY LLP

(57) ABSTRACT

An electronic apparatus and guide method for providing a guidance about a recipe are provided. An electronic apparatus sends a request, according to reception of a user input of inputting a first cooking element, a second cooking element, and a cooking element type, a server for at least one recommended cooking element related to the first cooking element and the second cooking element among a plurality of cooking elements belonging to the cooking element type, receive at least one recommended cooking element set as being associated with the cooking element type, display identification information of the at least one recommended cooking element according to a recommendation order, receive a user input of selecting one of the at least one recommended cooking element as a third cooking element, and store the selected third cooking element as recipe information together with the first cooking element and the second cooking element.

15 Claims, 23 Drawing Sheets

(58) Field of Classification Search
USPC .......................................................... 715/810
See application file for complete search history.

(56) References Cited

U.S. PATENT DOCUMENTS

| | | | | |
|---|---|---|---|---|
| 9,226,093 | B2 | 12/2015 | Park et al. | |
| 2009/0287644 | A1* | 11/2009 | Crosby | G16H 20/60 |
| 2013/0149676 | A1* | 6/2013 | Tokuda | A47J 36/321 434/127 |
| 2013/0149679 | A1* | 6/2013 | Tokuda | A47J 36/321 434/127 |
| 2014/0027439 | A1* | 1/2014 | Bach | A21B 1/22 219/412 |
| 2014/0095479 | A1* | 4/2014 | Chang | G06Q 30/0631 707/E17.005 |
| 2015/0339394 | A1* | 11/2015 | Jinq | G09B 19/00 715/776 |
| 2016/0005329 | A1* | 1/2016 | Sako | G09B 5/02 434/127 |
| 2016/0381742 | A1* | 12/2016 | Banavara | H05B 6/6438 99/331 |
| 2017/0097934 | A1* | 4/2017 | Aso | G06Q 30/02 |
| 2017/0161290 | A1* | 6/2017 | Kuroyama | G06Q 10/087 |
| 2019/0130786 | A1* | 5/2019 | Kumbakonam | G06Q 10/40 |
| 2020/0233897 | A1* | 7/2020 | Hite | H05B 1/0258 |
| 2020/0349630 | A1* | 11/2020 | Maruoka | G06Q 30/0623 |
| 2020/0351557 | A1* | 11/2020 | Drake | G06F 18/24 |
| 2021/0244229 | A1 | 8/2021 | Liang | |
| 2021/0312830 | A1* | 10/2021 | Ohtani | G06F 16/90335 |
| 2022/0022289 | A1* | 1/2022 | Singh | H05B 6/6441 |
| 2022/0188948 | A1* | 6/2022 | Sagong | A47J 36/321 |
| 2022/0273138 | A1* | 9/2022 | Du | A47J 36/32 |
| 2022/0338671 | A1 | 10/2022 | Fujita et al. | |
| 2022/0395135 | A1* | 12/2022 | Luckhardt | H05B 1/0261 |
| 2023/0046227 | A1* | 2/2023 | Yamada | G06F 40/109 |
| 2023/0066514 | A1* | 3/2023 | Yuki | G06F 3/0488 |
| 2023/0134600 | A1 | 5/2023 | Kim et al. | |
| 2024/0192832 | A1* | 6/2024 | Yuki | G06F 16/26 |
| 2024/0196939 | A1* | 6/2024 | Yamada | G06F 16/383 |
| 2024/0221146 | A1* | 7/2024 | Kotler | G06T 7/0006 |
| 2024/0319849 | A1* | 9/2024 | Jung | G06F 3/04847 |
| 2025/0190871 | A1* | 6/2025 | Sacha | A23L 5/10 |

FOREIGN PATENT DOCUMENTS

| | | | | | |
|---|---|---|---|---|---|
| JP | 2012-3319 | | | 1/2012 | |
| JP | 2012003319 | A | * | 1/2012 | |
| JP | 6591115 | | | 10/2019 | |
| KR | 10-2011-0035380 | | | 4/2011 | |
| KR | 10-2014-0094058 | | | 7/2014 | |
| KR | 10-1798616 | | | 11/2017 | |
| KR | 20180017596 | A | * | 2/2018 | G06Q 50/12 |
| KR | 10-2018-0067075 | | | 6/2018 | |
| KR | 20180067075 | A | * | 6/2018 | G06F 17/28 |
| KR | 10-1874604 | | | 7/2018 | |
| KR | 10-2127516 | | | 6/2020 | |
| KR | 10-2134643 | | | 7/2020 | |
| KR | 10-2020-0104592 | | | 9/2020 | |
| KR | 10-2020-0112230 | | | 10/2020 | |
| KR | 10-2163754 | | | 10/2020 | |
| KR | 10-2210476 | | | 2/2021 | |
| KR | 10-2236076 | | | 4/2021 | |
| KR | 10-2021-0052123 | | | 5/2021 | |
| KR | 10-2022-0012158 | | | 2/2022 | |
| KR | 10-2022-0042064 | | | 4/2022 | |
| KR | 10-2400880 | | | 5/2022 | |
| WO | WO 2018/124569 | A1 | | 7/2018 | |

OTHER PUBLICATIONS

Written Opinion dated Apr. 3, 2023 issued in PCT Application No. PCT/KR2022/021600.

* cited by examiner

FIG. 2

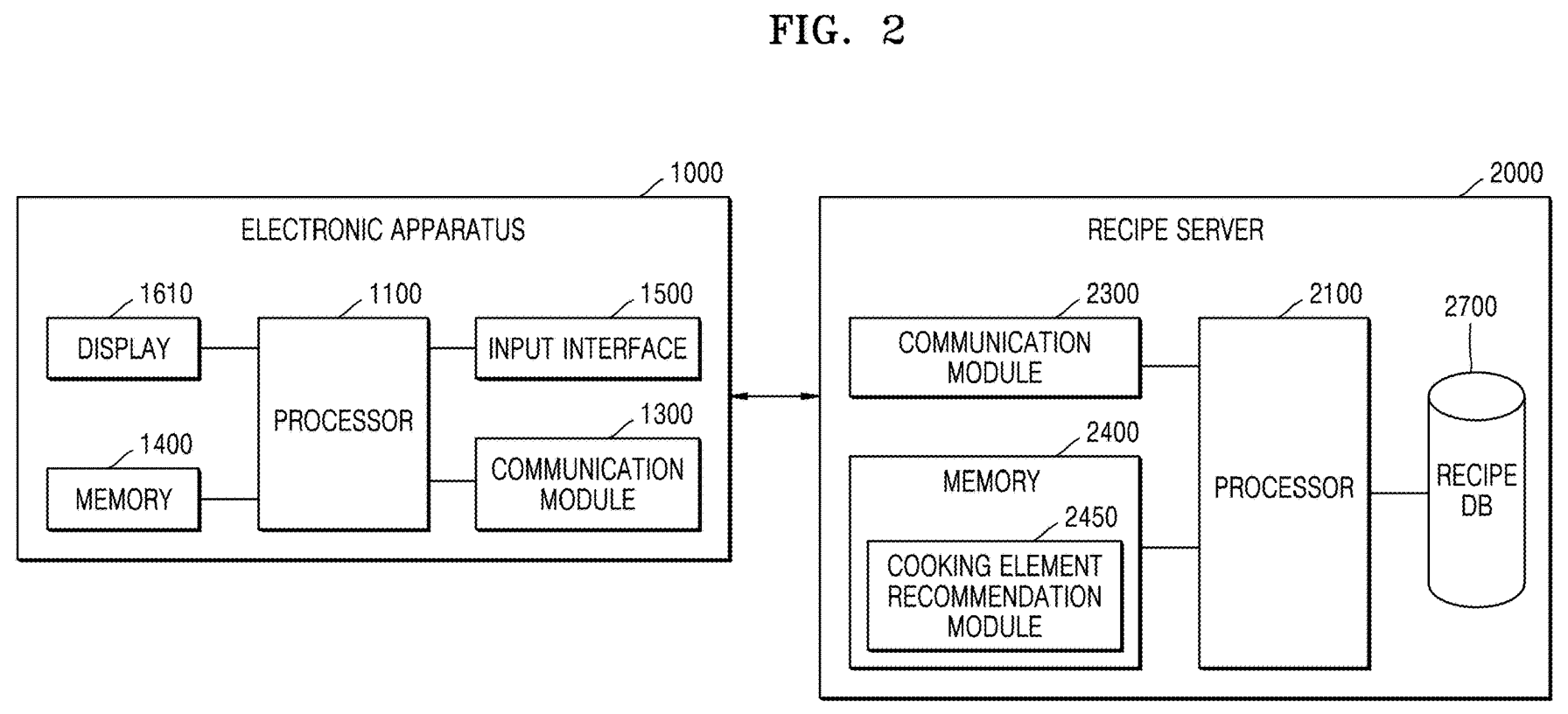

2000
RECIPE SERVER
2700
RECIPE DB
2100
PROCESSOR
2300
COMMUNICATION MODULE
2400
MEMORY
2450
COOKING ELEMENT RECOMMENDATION MODULE

1000
ELECTRONIC APPARATUS
1500
INPUT INTERFACE
1300
COMMUNICATION MODULE
1100
PROCESSOR
1610
DISPLAY
1400
MEMORY

470 module food cooker method boil grill

410

420

430

440

400

415

411

441

GrandmaChickenSoup

421

ChickenSoup rinse : 5 chicken : 400 boil : 30 chicken : 400 water : 2000 pot put salt : 30 pot chickenSoup:2200:35 grandmaSauce mix ketchup :30 vinegar : 15 sugar : 30

...

grandmaSauce :100:3 mix chickenSoup:2200 grandmaSauce:100:3 pot

GandmaChickenSoup:2300:40

Example

```
INFORMATION
name: GrandmaChickenSoup;
author: John Doe;
time: Aug 31 2021 05:00:00;
category: Western;
explanation: Chicken soup with grandma's secret sauce.
RECIPE
grandmaChickenSoup:2300:40 makeChickenSoup (chicken:400, salt:30,
water:2000, ketchup:30, vinegar:15, sugar:50, tabasco:5) {
    chickenSoup:2200:35 makeChickenSoup (chicken:400, salt:30, water:2000) {
            rinse:5 chicken:400;
            boil:30 chicken:400+water:2000 pot;
            put salt:30 pot;
            return chickenSoup:2200:35;
    }
    grandmaSauce:100:3 makeGMSauce (ketchup:30, vinegar:15, sugar:50,
tabasco:5) {
    mix ketchup:30+vinegar:15+sugar:50+tabasco:5 bowl;
     return grandmaSauce:100:3
    }
     mix chickenSoup:2200+grandmaSauce:100 pot;
     return grandmaChickenSoup:2300:40;
}
```

Try it Yourself

| Chicken | RELEVANCE RANK 1 | RELEVANCE RANK 2 | RELEVANCE RANK 3 | RELEVANCE RANK 4 | ... |
|---|---|---|---|---|---|
| COOKING METHOD | Fry:38427 | Grill:32498 | Steam:12323 | Bake:5342 | ... |
| COOKING TOOL | Pan:2831 | pot:1242 | Oven:1009 | Bowl:732 | ... |
| COOKING MATERIAL | Garlic:37294.5 | Salt:19283.9 | Tomato:10837.2 | Pork:9982.8 | ... |

720

| Soup | RELATED COOKING ELEMENT 1 | RELATED COOKING ELEMENT 2 | RELATED COOKING ELEMENT 3 | RELATED COOKING ELEMENT 4 | ... |
|---|---|---|---|---|---|
| COOKING METHOD | boil:98427 | stir:33293 | Steam:1233 | grill:843 | ... |
| COOKING TOOL | pot:89002 | bowl:23242 | pan:309 | oven:72 | ... |
| COOKING MATERIAL | water:103942.5 | salt:83092.9 | pepper:82923.2 | tomato:69982.8 | ... |

| Chicken+soup | | | | |
|---|---|---|---|---|
| COOKING METHOD | boil:98427 | Fry:38427 | stir:33293 | Grill:33311... |

| Chicken+boil | | | | |
|---|---|---|---|---|
| COOKING MATERIAL | Water:124349.3 | Salt:92952.3 | Pepper:852732.3 | Tomato:6882... |

| Chicken/2+water/2+boil | | | | |
|---|---|---|---|---|
| COOKING TOOL | Pot:109324 | Bowl:29382 | Pan:10023 | Oven:928 |

FIG. 15

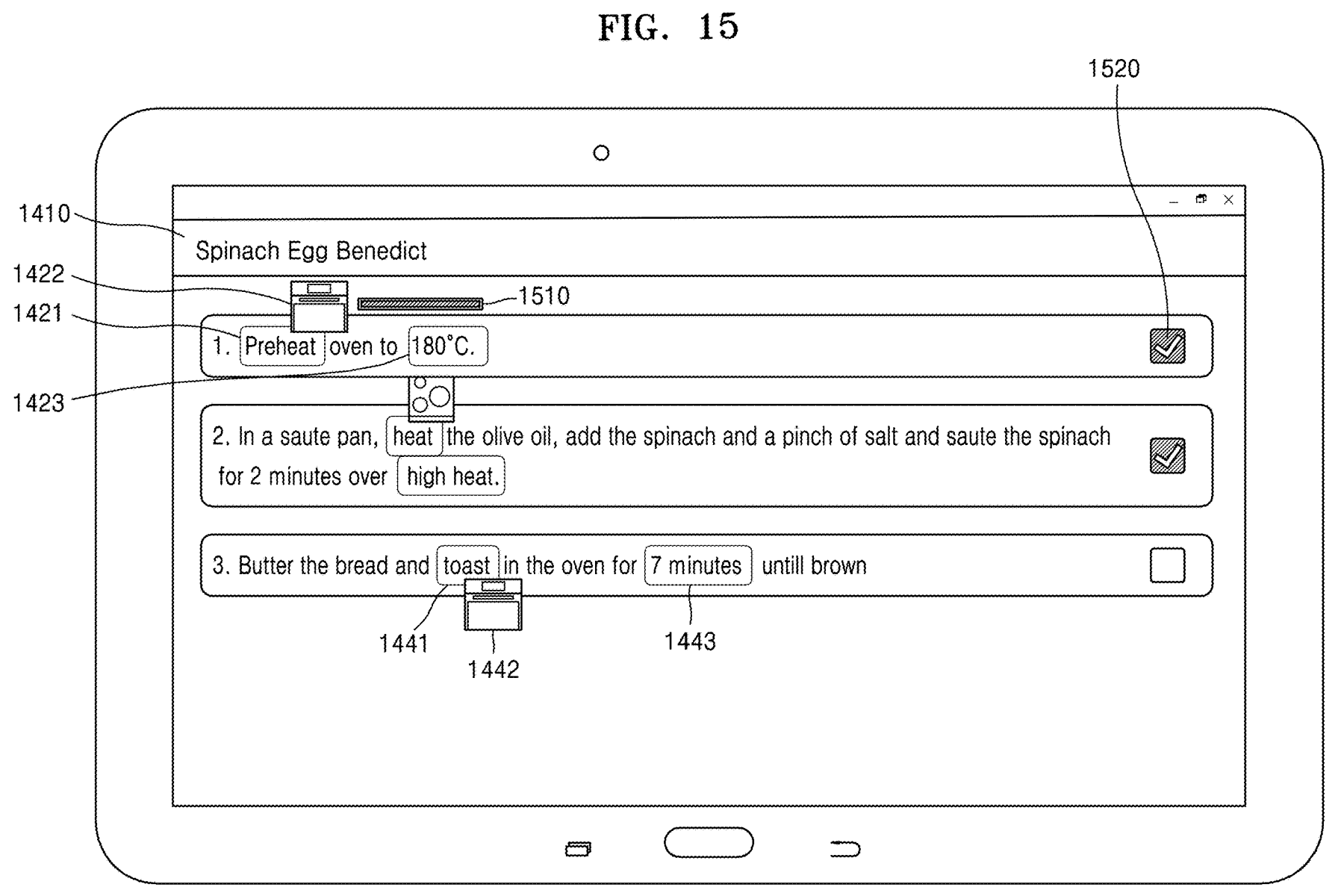

Spinach Egg Benedict

1. Preheat oven to 180°C.

2. In a saute pan, heat the olive oil, add the spinach and a pinch of salt and saute the spinach for 2 minutes over high heat.

3. Butter the bread and toast in the oven for 7 minutes untill brown 1410
1422
1421
1423
1510
1520
1441
1442
1443

DEVICE AND METHOD FOR PROVIDING GUIDANCE FOR RECIPE

CROSS-REFERENCE TO RELATED APPLICATION

This application is a continuation application, under 35 U.S.C. § 111(a), of international application No. PCT/KR2022/021600, filed on Dec. 29, 2022, which claims priority under 35 U. S. C. § 119 to Korean Patent Application No. 10-2022-0003621, filed Jan. 10, 2022, the disclosures of which are incorporated herein by reference in their entireties.

TECHNICAL FIELD

The present disclosure relates to an electronic apparatus for providing a guidance about a recipe and an operation method thereof. More specifically, the present disclosure relates to an electronic apparatus for providing a guidance about generation, search and application of a recipe, and an operation method thereof.

BACKGROUND ART

Recently, cooking culture at home expands in various ways, and cooking-related content from famous chefs and cooking researchers is influencing users through existing media such as television (TV).

In addition, due to the expansion of the influence of online media as well as traditional media, the culture of consumers who research and share recipes has spread, and various online or mobile platforms for sharing recipes are spreading.

Not only the demand from users to consume a variety of recipes from experts and non-experts increasing but also the demand from users for services to secondarily create and share recipes is also rapidly increasing.

However, because services that provide recipes register or share recipes in different formats, the same or similar recipes are distributed in different formats, which causes duplication of recipes and recipe efficiency issues.

Therefore, a method is needed to make recipe registration, recipe distribution, recipe search, and recipe use easier.

DISCLOSURE

Technical Solution

An aspect of an embodiment of the present disclosure may provide an electronic apparatus including an input interface, a display, a communication module, a memory to store at least one instruction, and at least one processor connected to the memory, wherein the at least one processor is configured to execute the at least one instruction to receive a user input of inputting a first cooking element and a second cooking element through the input interface, send a request for at least one recommended cooking element to a server, through the communication module, based on a user input of selecting a cooking element type related to the first cooking element and the second cooking element among a plurality of cooking elements belonging to the selected cooking element type, the server having stored therein recipe information according to a recipe storage format. receive the at least one recommended cooking element which is set as being associated with the selected cooking element type from the server, the at least one recommended cooking element being set as associated based on information about a relevance between the first cooking element and the plurality of cooking elements belonging to the selected cooking element type and information about a relevance between the second cooking element and the plurality of cooking elements belonging to the selected cooking element type, display identification information of the at least one recommended cooking element according to a recommendation order, through the display, receive a user input of selecting one of the at least one recommended cooking element as a third cooking element, through the input interface, and store the selected third cooking element as recipe information, together with the first cooking element and the second cooking element, in the memory.

An aspect of an embodiment of the present disclosure may provide a recipe guide method including receiving a user input of inputting a first cooking element and a second cooking element, sending a request for at least one recommended cooking element to a server, based on a user input of selecting a cooking element type related to the first cooking element and the second cooking element among a plurality of cooking elements belonging to the selected cooking element type, the server having stored therein recipe information according to a recipe storage format, receiving, from the server, the at least one recommended cooking element which is set as being associated with the selected cooking element type, the at least one recommended cooking element being set as associated based on information about a relevance between the first cooking element and the plurality of cooking elements belonging to the selected cooking element type and information about a relevance between the second cooking element and the plurality of cooking elements belonging to the selected cooking element type, displaying identification information of the at least one recommended cooking element according to a recommendation order, receiving a user input of selecting one of the at least one recommended cooking element as a third cooking element, and storing the selected third cooking element as recipe information together with the first cooking element and the second cooking element.

An aspect of an embodiment of the present disclosure may provide a computer-readable recording medium having recorded thereon a program for performing the recipe guide method, on a computer.

DESCRIPTION OF DRAWINGS

FIG. 2 is a block diagram of an electronic apparatus and a recipe server, according to an embodiment of the present disclosure.

FIG. 4 illustrates a recipe creation application provided by an electronic apparatus, according to an embodiment of the present disclosure.

FIG. 7 illustrates related cooking element database (DB), according to an embodiment of the present disclosure.

FIG. 15 illustrates a method of displaying state information of a cooking apparatus together with recipe information in an electronic apparatus, according to an embodiment of the present disclosure.

MODE FOR INVENTION

Figure 1:
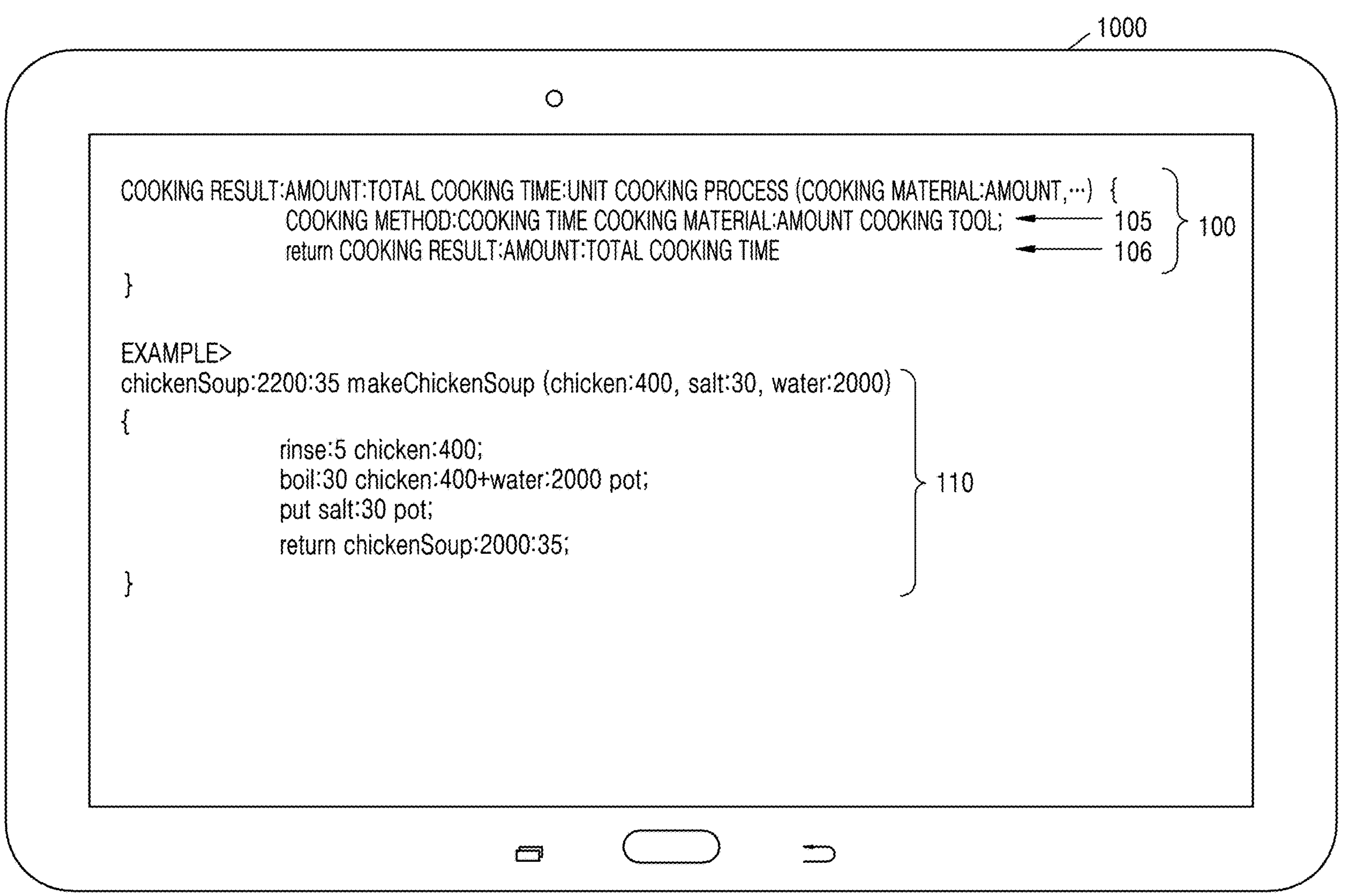
FIG. 1 illustrates a recipe storage format according to an embodiment of the present disclosure.

In the present disclosure, the expression “at least one of a, b or c” may indicate “a”, “b”, “c”, “a and b”, “a and c”, “b and c”, “all of a, b, and c”, or variations thereof.

Hereinafter, embodiments of the present disclosure will be described in detail with reference to the accompanying drawings so that the present disclosure may be readily implemented by one of ordinary skill in the technical field to which the present disclosure pertains. However, the present disclosure can be implemented in various different forms, and is not limited to the embodiments described herein. Also, in the drawings, portions irrelevant to the description are not shown in order to definitely describe the present disclosure, and throughout the entire specification, similar portions are assigned like reference numerals.

Although general terms being currently used were selected as terminology used in the present disclosure while considering the functions mentioned in the present disclosure, they may mean different terms according to intentions of one of ordinary skill in the art, judicial precedents, the advent of new technologies, and the like. Hence, the terms used in the present disclosure must be interpreted based on the meanings of the terms and the entire contents of the present disclosure, not by simply stating the terms themselves.

Although the terms “first”, “second”, etc. may be used herein to describe various components, these components should not be limited by these terms. These terms are only used to distinguish one component from another.

The terms used in the present disclosure are used to describe specific embodiments, not for the purpose of limiting the present disclosure. The singular forms “a,” “an,” and “the” include plural referents unless the context clearly dictates otherwise. Also, in the entire specification, the case in which a certain portion is “connected” to another portion includes the case in which the portion is “electrically connected” to the other portion with another device in between, as well as the case in which the portion is “directly connected” to the other portion. Also, it will be understood that when a certain portion “includes” a certain component, the portion does not exclude another component but can further include another component, unless the context clearly dictates otherwise.

The phrases ‘some embodiments’ or ‘an embodiment’ appearing several times in this specification do not necessarily indicate the same embodiment(s).

Embodiments of the present disclosure relate to an electronic apparatus for providing a guidance about recipe generation and an operation method thereof.

Other embodiments of the present disclosure relate to an electronic apparatus for providing a guidance about recipe search and an operation method thereof.

Other embodiments of the disclosure relate to an electronic apparatus for providing a guidance about cooking for a recipe and an operation method thereof.

In the present disclosure, the expression “at least one of a, b or c” may indicate “a”, “b”, “c”, “a and b”, “a and c”, “b and c”, “all of a, b, and c”, or variations thereof.

Hereinafter, embodiments of the present disclosure will be described in detail with reference to the accompanying drawings so that the disclosure may be readily implemented by one of ordinary skill in the technical field to which the present disclosure pertains. However, the present disclosure can be implemented in various different forms, and is not limited to the embodiments described herein. Also, in the drawings, portions irrelevant to the description are not shown in order to definitely describe the present disclosure, and throughout the entire specification, similar components are assigned like reference numerals.

Although general terms being currently used were selected as terminology used in the present disclosure while considering the functions mentioned in the disclosure, they may mean different terms according to intentions of one of ordinary skill in the art, judicial precedents, the advent of new technologies, and the like. Hence, the terms used in the present disclosure must be interpreted based on the meanings of the terms and the entire contents of the present disclosure, not by simply stating the terms themselves.

Although the terms “first”, “second”, etc. may be used herein to describe various components, these components should not be limited by these terms. These terms are only used to distinguish one component from another.

The terms used in the present disclosure are used to describe specific embodiments, not for the purpose of limiting the present disclosure. The singular forms “a,” “an,” and “the” include plural referents unless the context clearly dictates otherwise. Also, in the entire specification, the case in which a certain portion is “connected” to another portion includes the case in which the portion is “electrically connected” to the other portion with another device in between, as well as the case in which the portion is “directly connected” to the other portion. Also, it will be understood that when a certain portion “includes” a certain component, the portion does not exclude another component but can further include another component, unless the context clearly dictates otherwise.

The phrases ‘some embodiments’ or ‘an embodiment’ appearing several times in this specification do not necessarily indicate the same embodiment.

FIG. 1 illustrates a recipe storage format according to an embodiment of the present disclosure.

Referring to FIG. 1, an electronic apparatus 1000 may store a recipe in a recipe module form according to the recipe storage format.

A recipe may include a final cooking result, an amount of the final cooking result, and a total cooking time, and include a unit cooking process and a single cooking operation.

The single cooking operation may include at least one of a cooking material, an amount of the cooking material, a cooking method, a time taken for the cooking method, or a cooking tool. In the present disclosure, a cooking material, a cooking method, a cooking tool, and a cooking result may be referred to as cooking elements.

A group of two or more related single cooking operations may be expressed as a unit cooking process. A unit cooking process may include a total cooking time taken for the unit cooking process and a cooking result created by the unit cooking process, in addition to two or more single cooking operations.

According to an embodiment, the recipe storage format may be similar to a format of a programming language. The electronic apparatus 1000 may store a recipe as a recipe module 100. For example, the electronic apparatus 1000 may store a cooking material of a recipe as a parameter, store a cooking operation 105 for the cooking material stored as the parameter as content of the recipe module 100, and store a cooking result 106 generated by the cooking operation as a return value of the recipe module 100.

For example, referring to FIG. 1, 'chicken' of 400 g, 'salt' of 30 g, and 'water' of 2000 g, as cooking materials of a 'chickenSoup' recipe, may be stored as parameters of a 'chickenSoup' recipe module 110, a first single cooking operation to 'rinse' the 'chicken' of 400 g for 5 minutes, a second single cooking operation to 'boil' the 'chicken' of 400 g and 'water' of 2000 g in a 'pot' for 30 minutes, and a third single cooking operation to 'put' 'salt' of 30 g into the 'pot' may be stored as content of the 'chickenSoup' recipe module 110, and 'chickenSoup' of 2200 g as a cooking result of the 'chickenSoup' recipe and a total cooking time of 35 minutes may be stored as return values of the 'chickenSoup' recipe module 110.

Also, according to an embodiment, the electronic apparatus 1000 may identify types of cooking elements in correspondence to the respective cooking elements. The types of cooking elements may include a cooking material type, a cooking method type, a cooking result type, or a cooking tool type.

For example, a single cooking operation may be stored as single cooking operation data 105, and the single cooking operation data 105 may be stored in the order of 'cooking method:cooking time cooking material:amount cooking tool;'. For example, as illustrated in FIG. 1, the electronic apparatus 1000 may store single cooking operation data in a format of 'boil:30 chicken:400+water:200 pot;'. Accordingly, the electronic apparatus 1000 may identify types of cooking elements based on a storage order of the cooking elements.

Also, according to another example, the electronic apparatus 1000 may store types of cooking elements in correspondence to the cooking elements. For example, as illustrated in FIG. 1, the electronic apparatus 1000 may store cooking elements in a format of 'cooking method=boil:30, cooking material=chicken:400+water:2000, cooking tool=pot'. Accordingly, the electronic apparatus 1000 may identify types of cooking elements based on cooking element types stored to correspond to the cooking elements.

According to an embodiment, the electronic apparatus 1000 may provide a search user interface (UI) for searching for recipes stored in a recipe Database (DB), based on a recipe storage format. For example, the electronic apparatus 1000 may provide a search UI capable of selecting or excluding a cooking material, a cooking method, and a cooking tool. Also, the electronic apparatus 1000 may provide a search UI capable of searching for a recipe based on a single cooking operation.

According to an embodiment, the electronic apparatus 1000 may guide a user's cooking by identifying a cooking method and a cooking tool based on a recipe storage format and controlling a cooking apparatus based on the identified cooking method and cooking tool.

FIG. 2 is a block diagram of an electronic apparatus and a recipe server, according to an embodiment of the present disclosure.

Referring to FIG. 2, the electronic apparatus 1000 may include a processor 1100, a memory 1400, a display 1610, an input interface 1500, and a communication module 1300.

The input interface 1500 may detect a user input for controlling the electronic apparatus 1000. The input interface 1500 may receive a user input and transfer the user input to the processor 1100.

The input interface 1500 may include a user input electronic apparatus including a touch panel that detects a user's touch, a button that receives a user's push operation, a wheel that receives a user's rotation operation, a key board, a dome switch, etc., although not limited thereto.

The display 1610 may output information through a display panel (not shown) according to a control by the processor 1100.

The memory 1400 may store various information, data, instructions, programs, etc. required for operations of the electronic apparatus 1000.

The communication module 1300 may transmit/receive information to/from an external device or an external server according to a protocol under a control by the processor 110.

The processor 1100 may control overall operations of the electronic apparatus 1000. The processor 1100 may control components of the electronic apparatus 1000 by executing a program stored in the memory 1400.

Referring to FIG. 2, the recipe server 2000 may include a processor 2100, a communication module 2300, a memory 2400, and a recipe DB 2400.

The processor 2100 may control overall operations of the recipe server 2000. The processor 2100 may control components of the server 2000 by executing a program stored in the memory 2400.

The communication module 2300 may transmit/receive information to/from an external device or an external server according to a protocol under a control by the processor 2100.

The memory 2400 may store various information, data, instructions, programs, etc. required for operations of the recipe server 2000. For example, a cooking element recommendation module 2450 in the memory 2400 may be a program that recommends at least one cooking element based on a plurality of cooking elements input in advance.

The recipe DB 2700 may store a plurality of recipes.

According to an embodiment, the processor 1100 may receive a user input of inputting a first cooking element and a second cooking element, through the input interface 1500.

Also, according to reception of a user input of inputting a cooking element type, the processor 1100 may request the recipe server 2000 for at least one recommended cooking element related to the first cooking element and the second cooking element among a plurality of cooking elements belonging to the selected cooking element type, through the communication module 1300.

Also, the processor 2100 of the recipe server 2000 may execute a relevance calculation module 2450 in the memory 2400 to set recommendation ranks of the plurality of cooking elements, based on information about a relevance between the first cooking element and the plurality of cooking elements belonging to the selected cooking element type and information about a relevance between the second cooking element and the plurality of cooking elements belonging to the selected cooking element type.

Also, the processor 2100 of the recipe server 2000 may set at least one recommended cooking element based on the recommendation ranks of the plurality of cooking elements.

Also, the processor 2100 of the recipe server 2000 may transmit the at least one set recommended cooking element to the electronic apparatus 1000, through the communication module 2300.

Also, according to reception of the at least one recommended cooking element through the communication module 1300, the processor 1100 may display identification information of the at least one recommended cooking element, according to the recommendation ranks, through the display 1610.

Also, the processor 1100 may receive a user input of selecting one of the at least one recommended cooking element as a third cooking element, through the input interface 1500.

Also, the processor 1100 may store the selected third cooking element as recipe information, together with the first cooking element and the second cooking element, in the memory 1400.

Also, the processor 1100 may transmit the selected third cooking element as recipe information, together with the first cooking element and the second cooking element, to the recipe server 2000, through the communication module 1300.

Also, the processor 2100 of the recipe server 2000 may store the received first cooking element, second cooking element, and third cooking element as recipe information in the recipe DB 2700.

Figure 3:
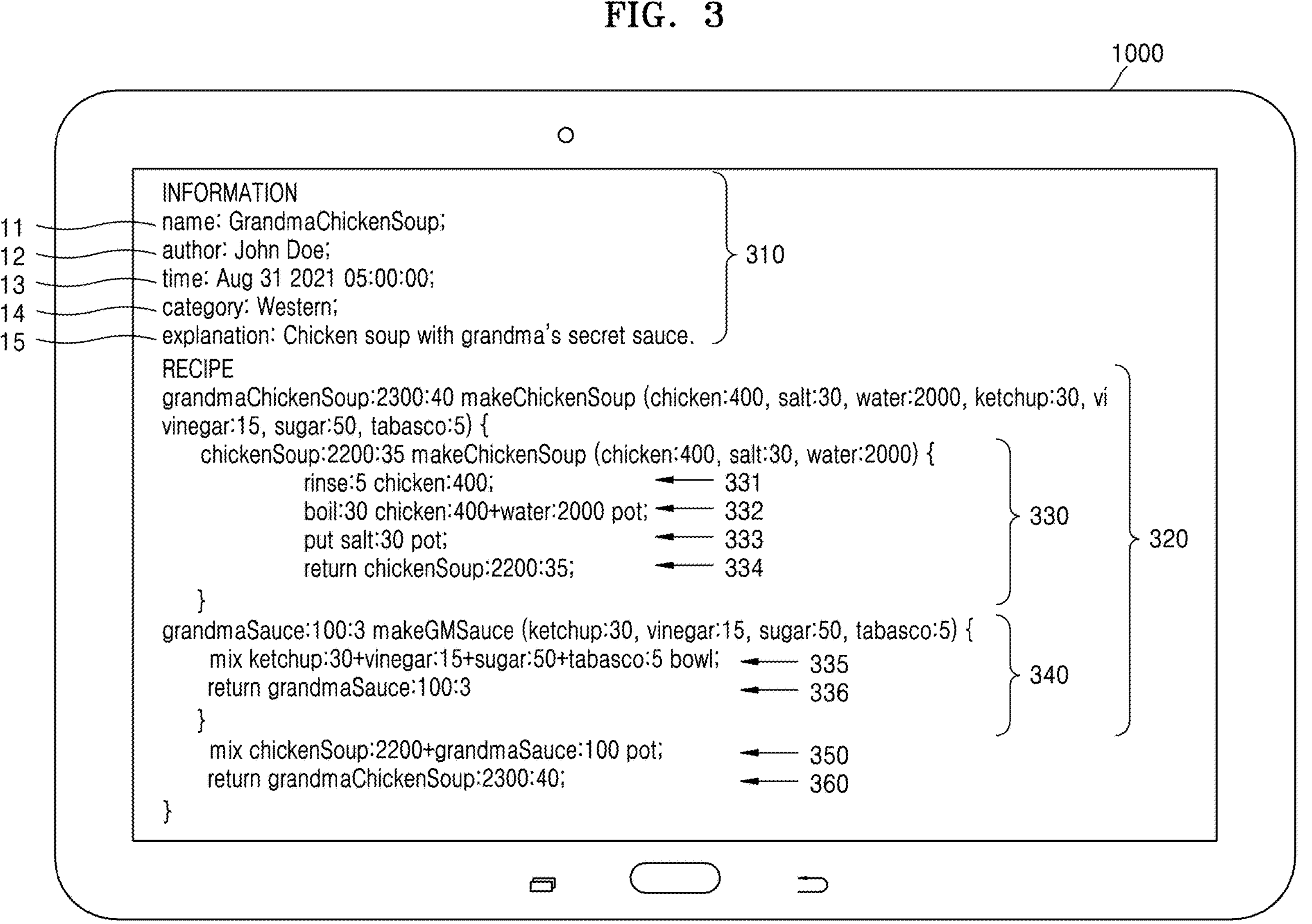
FIG. 3 illustrates a storage format of a recipe stored by an electronic apparatus or a recipe server, according to an embodiment.

FIG. 3 illustrates a recipe storage format stored by an electronic apparatus or a recipe server, according to an embodiment.

Referring to FIG. 3, the electronic apparatus 1000 or the recipe server (not shown) may store recipe information according to a recipe storage format.

The recipe information may be divided into additional information 310 representing information about the recipe except for a cooking process and a recipe module 320 representing the cooking process of the recipe.

The additional information 310 may include a name 311 of the recipe, a writer 312, a created time 313, a category 314 of the recipe, and additional explanation 315 about the recipe.

A recipe module according to an embodiment may include at least one of a unit cooking process module or single cooking operation data. For example, referring to FIG. 3, a gradmaChickenSoup recipe module 320 may include a chickenSoup unit cooking process module 330, a grandmaSauce unit cooking process module 340, and single cooking operation data 350 of mixing chikenSoup with grandmaSauce.

Also, a unit cooking process module may include at least one single cooking operation data. For example, referring to FIG. 3, the chickenSoup unit cooking process module 330 may include three pieces of single cooking operation data 331 to 333.

Also, single cooking operation data may include a cooking method, a cooking material, and a cooking tool. Also, according to an embodiment, single cooking operation data may be configured only with a cooking method and a cooking material. For example, single cooking operation data 'rinse:5 chicken:400;' may include rinse:5 as a cooking method and chicken:400 as a cooking material.

According to an embodiment, the recipe module 320 and the unit cooking process modules 330 and 340 may be stored in a function format of a programming language.

For example, cooking materials used in a unit cooking process may be stored as parameters of the unit cooking process module 330 or 340, single cooking operation data 331 to 333 and 335 representing a cooking operation for the cooking materials may be stored as content of the unit cooking process module 330 or 340, and cooking results 334 and 336 generated by performing the cooking operation for the cooking materials may be stored as return values of the unit cooking process module 330 or 340. Also, the cooking operation data 331 to 333 and 335 may include cooking elements (a cooking method, a cooking material, and a cooking tool) as variable names and times or amounts of the respective cooking elements as values stored in the variables.

Referring to FIG. 3, the 'grandmaChickenSoup' recipe module 320 represents that chicken of 400 g, salt of 30 g, water of 3 kg, ketchup of 30 g, vinegar of 15 g, sugar of 50 g, and tabasco of 5 g are used as cooking materials, a final cooking result is grandmaChickenSoup of 2300 g, and a total cooking time is 40 minutes.

The unit cooking process module 330 of 'chickenSoup' represents that chicken soup of 2200 g is made by rinsing chicken of 400 g for 5 minutes, boiling the chicken of 400 g and water of 2 kg in a pot for 30 minutes, and then putting salt of 30 g into the pot.

The unit cooking process module 340 of 'grandmaSauce' represents that grandma Sauce of 100 g is made by putting ketchup of 30 g, vinegar of 15 g, sugar of 50 g, and tabasco of 5 g into a bowl and mixing.

Also, a unit cooking process module may be reused in a recipe. For example, the unit cooking process module 330 of 'chickenSoup' and the unit cooking process module 340 of 'grandmaSauce' may be used as a cooking material in the recipe.

For example, the 'grandmaChickenSoup' recipe module 320 may include a single cooking operation of mixing the chicken soup of 2200 g and the grandma sauce of 100 g in a pot, and represents that 'grandmaChickenSoup' of 2300 g is made as a final cooking material.

Also, according to reception of a user input of inputting a recipe, the electronic apparatus 1000 may provide a plurality of cooking elements that may be input as a cooking material, a cooking tool, and a cooking method. For example, the electronic apparatus 1000 may provide reserved words, such as chicken, beef, salt, and sugar, to correspond to cooking materials.

The electronic apparatus 1000 may generate recipe information having a format as shown in FIG. 3 based on a user input of inputting a recipe, and according to an embodiment, the electronic apparatus 1000 may receive (for example, web crawling) recipe information in a natural language format from a plurality of external servers that store recipes, and convert the received recipe information in the natural language format into recipe information having a format as shown in FIG. 3.

FIG. 4 illustrates a recipe generation application provided by an electronic apparatus according to an embodiment of the present disclosure.

Referring to FIG. 4, the electronic apparatus 1000 may provide a recipe creation application based on an image interface, in addition to a recipe creation application in a text format.

A recipe creation application may include a selection menu 410 to 440 for selecting a type of a cooking element to be input. The menu 410 to 440 for selecting a type of a cooking element may include a cooking module selection menu 410, a cooking material selection menu 420, a cooking tool selection menu 430, and a cooking method selection menu 440, although not limited thereto.

According to reception of a user input of selecting the cooking module selection menu 410, the electronic apparatus 1000 may generate a first cooking module object 415. According to the first cooking module object 415 being a first cooking module object, the electronic apparatus 1000 may generate a recipe module to correspond to the first cooking module object 415. Also, according to reception of a user input of inputting 'GrandmaChickenSoup' as a name of the first cooking module object 415, the electronic apparatus 1000 may set 'GrandmaChickenSoup' to a name of the recipe module.

Thereafter, according to reception of a user input of again selecting the cooking module selection menu 410, the electronic apparatus 1000 may generate a second cooking module object 411. According to reception of a user input of moving the second cooking module object 411 into the first cooking module object 415 by dragging and dropping the second cooking module object 411, the electronic apparatus 1000 may generate a first unit cooking process module of the recipe module to correspond to the second cooking module object 411. Also, according to reception of a user input of inputting 'chickenSoup' as a name of the second cooking module object 411, the electronic apparatus 1000 may set 'chickenSoup' to a name of the first unit cooking process module.

Thereafter, according to reception of a user input of selecting the cooking method selection menu 440, the electronic apparatus 1000 may generate a first cooking method object 441. As another embodiment, according to reception of a user input of selecting the cooking method selection menu 440, the electronic apparatus 1000 may display a plurality of pre-stored cooking methods.

Also, according to reception of a user input of moving the first cooking method object 441 into the second cooking module objet 411 by dragging and dropping the first cooking method object 441, the electronic apparatus 1000 may generate first cooking operation data corresponding to the first cooking method object 441. Also, the electronic apparatus 1000 may receive a user input of inputting 'rinse' as a cooking method corresponding to the first cooking method object 441 and inputting '5' as a cooking time by the cooking method. The electronic apparatus 1000 may store the input cooking method and cooking time as first single cooking operation data of the first unit cooking process module.

Thereafter, according to reception of a user input of selecting the cooking material selection menu 420, the electronic apparatus 1000 may generate a cooking material object 421. A user input of moving the generated cooking material object 421 next to the first cooking method object 441 in the second cooking module object 411 by dragging and dropping the cooking material object 421 may be received, and a user input of inputting 'chicken:400' as a cooking material corresponding to the cooking material object 421 may be received. Accordingly, the electronic apparatus 1000 may store first cooking operation data including 'rinse:5' as a cooking method and 'chicken:400' as a cooking material.

Successively, the electronic apparatus 1000 may receive a user input of inputting second cooking operation data including 'boil:30', 'chicken:400', 'water:2000', and 'pot' and third cooking operation data including 'put', 'salt:30', and 'pot' by using the selection menus 420 to 440.

Also, the electronic apparatus 1000 may receive a user input of inputting cooking result data 'chickenSoup:2200:35' of the first unit cooking process module.

The electronic apparatus 1000 may convert recipe information 400 in an image format into recipe information 470 in a text format, and convert the recipe information 470 in the text format into the recipe information 400 in the image format.

According to reception of a user input of inputting recipe information, the electronic apparatus 1000 may convert a format of the recipe information and display the recipe information, in real time.

According to an embodiment, the electronic apparatus 1000 may provide recipe creation guide information. For example, according to reception of a user input of inputting a cooking name, the electronic apparatus 1000 may provide all recipe information having a cooking name that is similar to the input cooking name among cooking names stored in the recipe DB.

Figure 5:
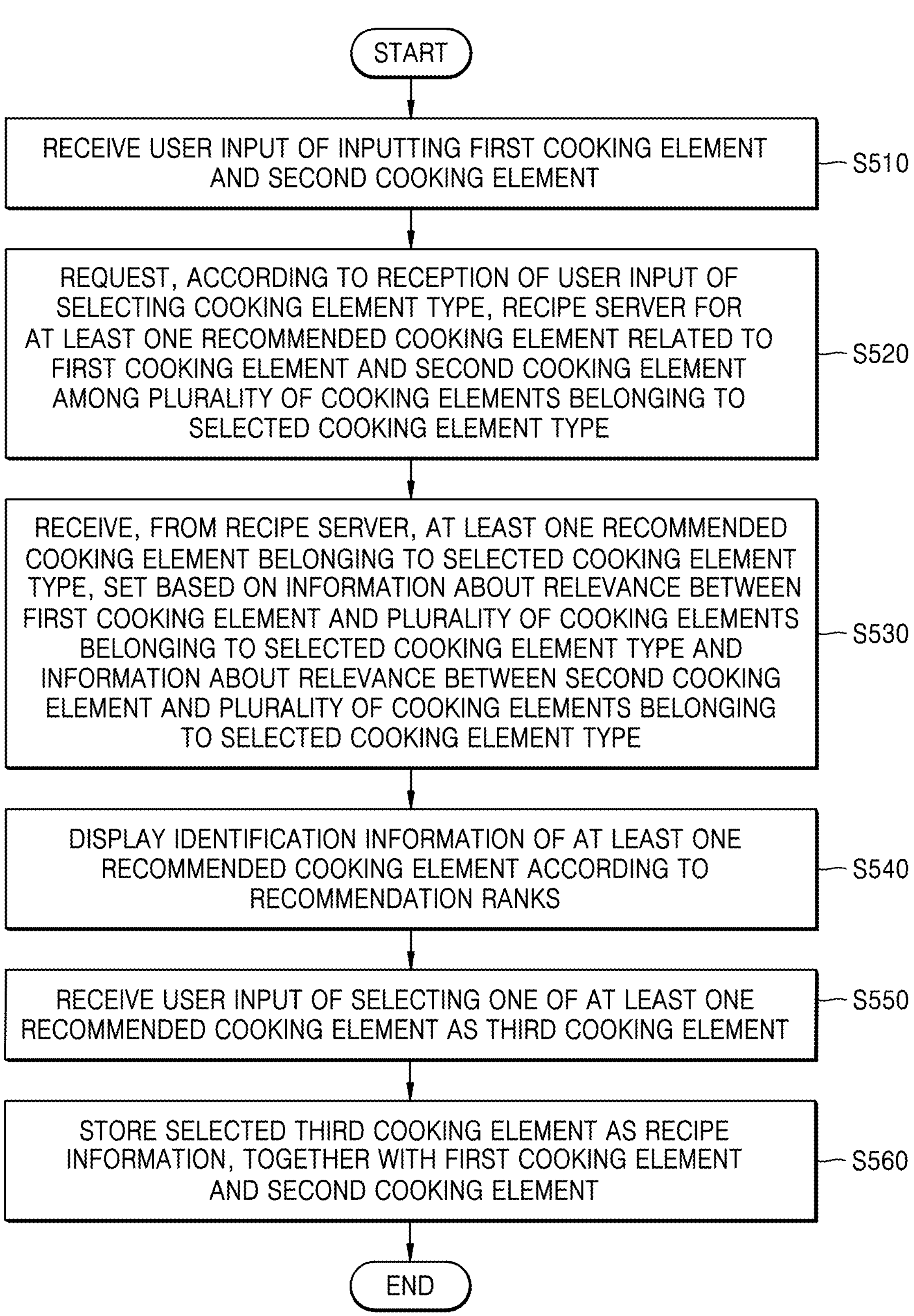
FIG. 5 is a flowchart illustrating a method of providing a guidance about a recipe in an electronic apparatus, according to an embodiment of the present disclosure.

FIG. 5 is a flowchart illustrating a method of providing a guidance about a recipe in an electronic apparatus, according to an embodiment of the present disclosure.

In operation S510, the electronic apparatus 1000 may receive a user input of inputting a first cooking element and a second cooking element.

A cooking element may be one of a cooking material, a cooking method, a cooking tool, or a cooking result.

Also, according to an embodiment, the electronic apparatus 1000 may obtain the first cooking element of a cooking material type from a cooking name.

In operation S520, according to reception of a user input of selecting a cooking element type, the electronic apparatus 1000 may request the recipe server 2000 for at least one recommended cooking element related to the first cooking element and the second cooking element among a plurality of cooking elements belonging to the selected cooking element type.

As a request for the recommended cooking element, the electronic apparatus 1000 may transmit identification information of the first cooking element and the second cooking element to the recipe server 2000.

The cooking element type may include a cooking material type, a cooking method type, a cooking tool type, and a cooking result type.

According to an embodiment, the recipe server 2000 may set recommendation ranks of the plurality of cooking elements belonging to the selected cooking element type, based on information about a relevance between the first cooking element and the plurality of cooking elements belonging to the selected cooking element type and information about a relevance between the second cooking element and the plurality of cooking elements belonging to the selected cooking element type.

Also, the recipe server 2000 according to an embodiment may set recommendation ranks of the plurality of cooking elements by applying a first weight to the information about the relevance between the first cooking element and the plurality of cooking elements belonging to the selected cooking element type and applying a second weight that is different from the first weight to the information about the relevance between the second cooking element and the plurality of cooking elements belonging to the selected cooking element type.

The recipe server 2000 may set a preset number of cooking elements with higher recommendation ranks to the at least one recommended cooking element.

In operation S530, the electronic apparatus 1000 may receive, from the recipe server 2000, the at least one recommended cooking element belonging to the selected cooking element type, set based on the information about the relevance between the first cooking element and the plurality of cooking elements belonging to the selected cooking element type and the information about the relevance between the second cooking element and the plurality of cooking elements belonging to the selected cooking element type.

In operation S540, the electronic apparatus 100 may display identification information of the at least one recommended cooking element according to the recommendation ranks.

In operation S550, the electronic apparatus 1000 may receive a user input of selecting one of the at least one recommended cooking element as a third cooking element.

In operation S560, the electronic apparatus 1000 may store the selected third cooking element as recipe information, together with the first cooking element and the second cooking element.

Also, according to an embodiment, the electronic apparatus 1000 may transmit the selected third cooking element as recipe information, together with the first cooking element and the second cooking element, to the recipe server 2000.

Also, according to an embodiment, the electronic apparatus 1000 may store the selected cooking element type as a cooking element type of the third cooking element.

Also, according to an embodiment, the electronic apparatus 1000 may calculate a relevance between the first cooking element, the second cooking element, and the third cooking element, and store the calculated relevance.

Also, according to an embodiment, the electronic apparatus 1000 may display, as a recipe search UI, a first menu for selecting at least one of a plurality of cooking materials, a second menu for selecting at least one of a plurality of cooking methods, and a third menu for selecting at least one of a plurality of cooking tools, and provide at least one recipe including cooking elements input through the first menu, the second menu, and the third menu among a plurality of recipes stored in the recipe server 2000.

Also, according to an embodiment, the recipe server 2000 may store a plurality of recipes including a plurality of pieces of single cooking operation data.

The electronic apparatus 1000 may display, as the recipe search UI, a menu for inputting two or more single cooking operations, and display at least one recipe including two or more input single cooking operations input among the plurality of recipes.

Also, according to an embodiment, the electronic apparatus 1000 may identify, as a cooking guide method, a cooking tool among cooking elements in the recipe information, set a cooking apparatus corresponding to the cooking tool among at least one cooking apparatus that is controllable by the electronic apparatus 1000, generate control information based on the recipe, and transmit the generated control information to the cooking apparatus.

In this case, the electronic apparatus 1000 may display identification information of the set cooking apparatus and a UI object for driving the cooking apparatus, together with the recipe information, and, according to reception of a user input of driving the cooking apparatus through the UI object, the electronic apparatus 1000 may transmit the generated control information to the cooking apparatus.

Also, according to an embodiment, as a result of transmitting the control information to the cooking apparatus, the electronic apparatus 1000 may receive state information of the cooking apparatus from the cooking apparatus, and display the received state information together with the recipe information.

Figure 6:
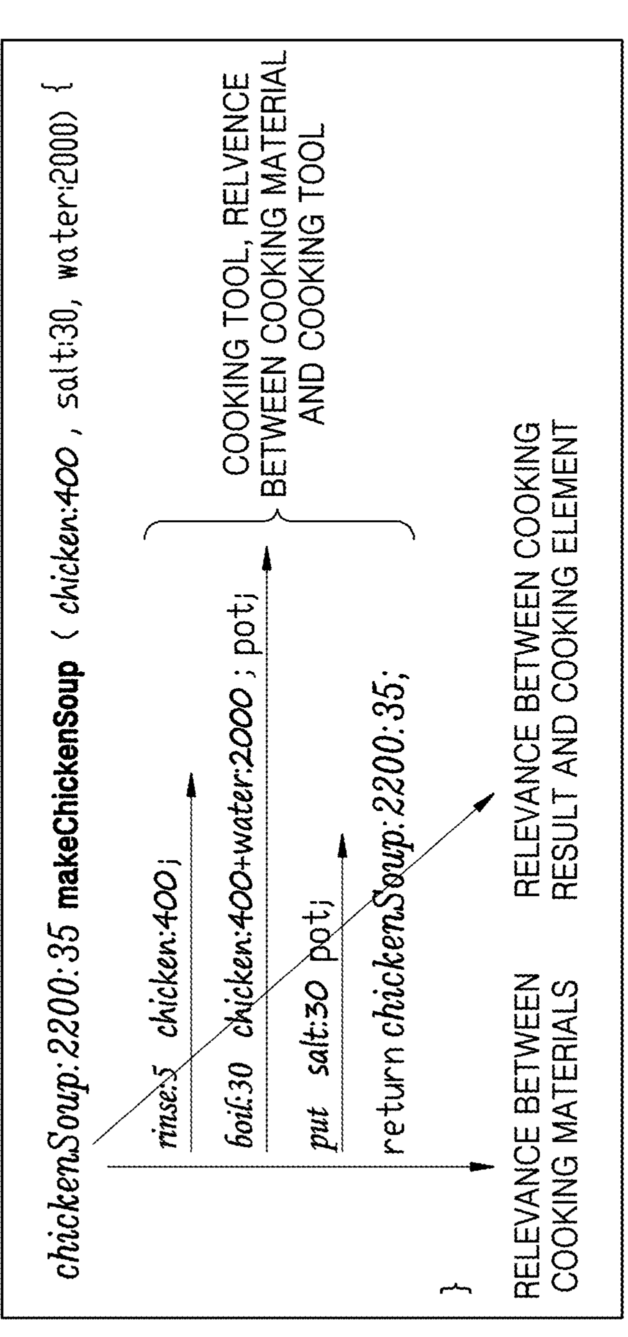
FIG. 6 illustrates a method of calculating relevances between cooking elements in an electronic apparatus, according to an embodiment of the present disclosure.

FIG. 6 illustrates a method of calculating relevances between cooking elements in an electronic apparatus, according to an embodiment of the present disclosure.

Referring to FIG. 6, the electronic apparatus 1000 may calculate a relevance between cooking elements based on recipe information. For example, the electronic apparatus 1000 may calculate a relevance of a cooking element with a plurality of cooking elements.

The electronic apparatus 1000 may identify a cooking element type of the cooking element from the recipe information. For example, the electronic apparatus 1000 may identify 'Soup' as a cooking result from a name 'chicken-Soup' of a recipe module of FIG. 6 through character string recognition. Also, for example, the electronic apparatus 1000 may identify the cooking element type of the cooking element based on a storage order of cooking elements. For example, in the case in which cooking elements are stored in the order of cooking method, cooking material, and cooking tool in single cooking operation data, the electronic apparatus 1000 may identify the cooking element type of the cooking element based on the order of the cooking elements.

For example, referring to FIG. 6, the electronic apparatus 1000 may identify 'rinse', 'boil', and 'put' as cooking methods, identify 'chicken', 'water', and 'salt' as cooking materials, and identify 'pot' as a cooking tool.

Because a single cooking operation corresponding to a line in a recipe module is performed independently, a cooking method and a cooking tool in the single cooking operation may have a high relevance. Accordingly, the electronic apparatus 1000 may increase a relevance between a cooking method and a cooking tool in a line by a value (for example, 1) that is greater than or equal to a reference value (for example, 0.5). For example, in FIG. 6, the electronic apparatus 1000 may increase a relevance between boil and chicken by 1 and increase a relevance between boil and water by 1.

Also, cooking materials in single cooking operation data corresponding to a line in a recipe module may have a high relevance. Accordingly, the electronic apparatus 1000 may increase a relevance between cooking materials in a line by a value that is greater than or equal to a reference value. For example, in FIG. 6, the electronic apparatus 1000 may increase a relevance between chicken and water by 1.

Also, cooking materials located on different lines in a recipe module may have a little relevance. Accordingly, the electronic apparatus 1000 may increase a relevance between cooking materials on different lines by a value (for example, 0.1) that is smaller than or equal to the reference value. For example, in FIG. 6, the electronic apparatus 1000 may increase a relevance between chicken and salt by 0.1.

Also, cooking elements in a recipe module may have a high relevance with a cooking result. Accordingly, the electronic apparatus 1000 may increase a relevance between the cooking elements in the recipe module and the cooking result by a value that is greater than or equal to the reference value.

The electronic apparatus 1000 may store the relevances between the cooking elements in a related cooking element DB.

For example, referring to FIG. 6, the electronic apparatus 1000 may increase a relevance of 'chicken' by +1 in a related cooking element DB of 'rinse', and increase a relevance of 'rinse' by +1 in a related cooking element DB of 'chicken'. Also, the electronic apparatus 1000 may increase relevances of 'chicken', 'water', and 'boil' by +1 in a related cooking element DB of 'boil'. Also, the electronic apparatus 1000 may increase relevances of 'rinse', 'boil', 'pot', and 'water' by +1 in the related cooking element DB of 'chicken', and increase a relevance of 'salt' by +0.1.

FIG. 7 illustrates related cooking element DBs according to an embodiment of the present disclosure.

Referring to FIG. 7, the recipe server 200 may generate a related cooking element DB that stores relevances of a cooking element with a plurality of cooking elements according to cooking method types, cooking tool types, and cooking material types.

For example, referring to a related cooking element DB 710 of Chicken of FIG. 7, the recipe server 2000 may store relevances of Chicken with cooking methods, such as Fry, Grill, Steam, and Bake, in correspondence to cooking method types, in the related cooking element DB.

Also, the recipe server 2000 may store relevance ranks of a cooking element with a plurality of cooking elements.

In the case in which the relevances of 'chicken' with the cooking methods are ranked in the order of 'Fry', 'Grill', Steam', and 'Bake', the recipe server 2000 may store relevance ranks in the order of 'Fry', 'Grill', 'Steam', and 'Bake' in correspondence to 'chicken'.

Accordingly, the recipe server 2000 may obtain cooking elements with high relevance ranks according to cooking method types, cooking tool types, and cooking material types from a related cooking element DB of a cooking element. For example, referring to FIG. 7, the recipe server 2000 may obtain 'Pot' as a cooking tool having a highest relevance with 'Soup' from a related cooking element DB 720 of 'Soup'.

FIGS. 8A to 8H illustrate a method of providing a guidance about recipe generation by recommending a cooking element in an electronic apparatus, according to an embodiment of the present disclosure.

Figure 8A:
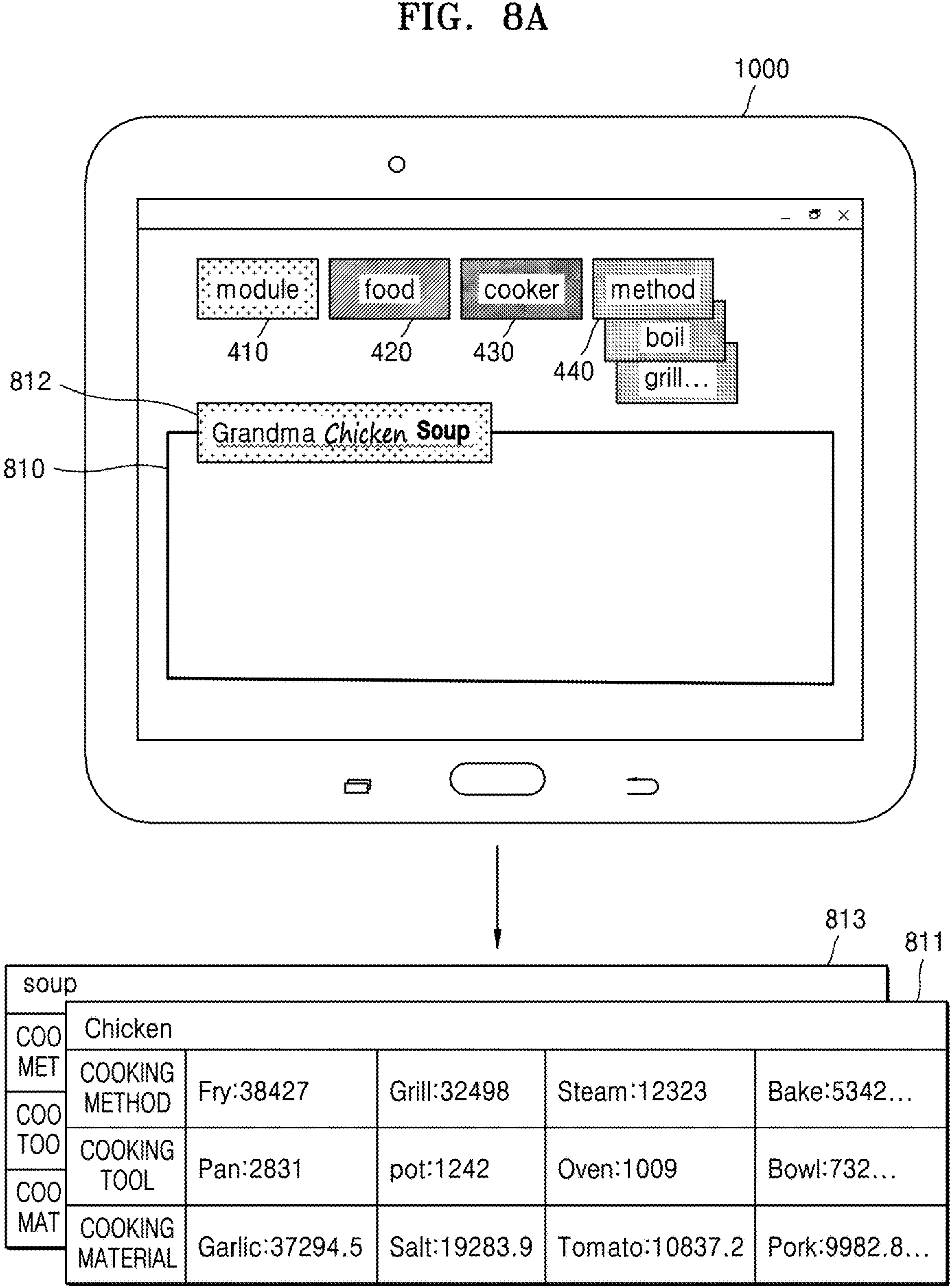
FIGS. 8A to 8H illustrate a method of providing a guidance about recipe generation by recommending a cooking element in an electronic apparatus, according to an embodiment of the present disclosure.

Referring to FIG. 8A, the electronic apparatus 1000 may receive a user input of selecting the cooking module selection menu 410 for inputting a cooking module. According to reception of a user input of selecting the cooking module selection menu 410, the electronic apparatus 1000 may display a cooking module object 810.

Also, the electronic apparatus 1000 may generate a recipe module corresponding to the cooking module object 810 which is a first module object. Also, according to reception of a user input of inputting a recipe name 'GrandmaChickenSoup' to a recipe name object 812, the electronic apparatus 1000 may store 'GrandmaChickenSoup' as a recipe name of the recipe module. According to reception of a user input of inputting a recipe name, the electronic apparatus 1000 may identify a cooking element from the input recipe name. Referring to FIG. 8A, the electronic apparatus 1000 may identify 'Chicken' as a cooking material and 'Soup' as a cooking result from 'GrandmaChickenSoup'.

Figure 8B:
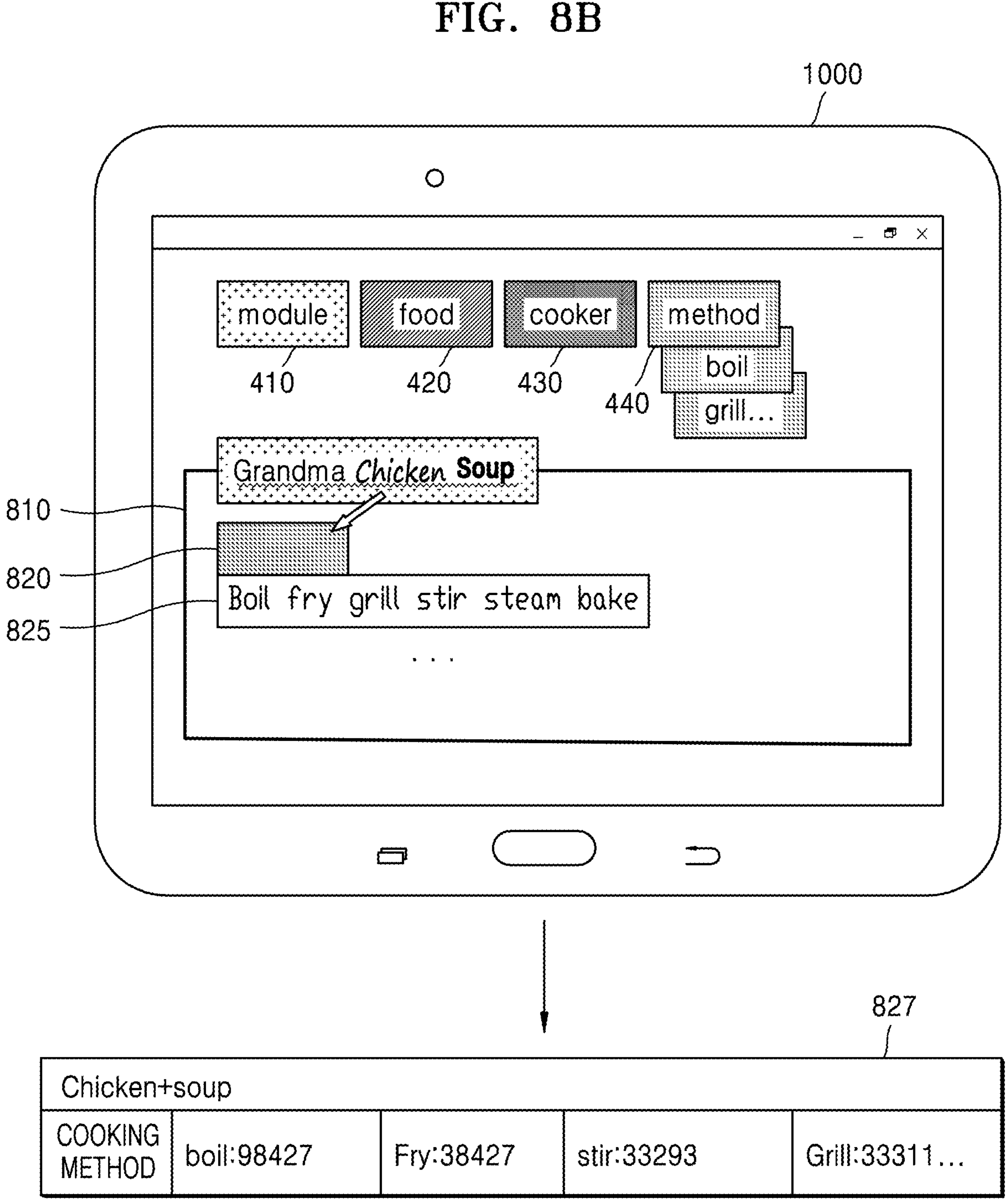

Referring to FIG. 8B, according to reception of a user input of selecting the cooking method selection menu 440, the electronic apparatus 1000 may request the recipe server 2000 for at least one recommended cooking method.

According to reception of the request for at least one recommended cooking method, the recipe server 2000 may obtain related cooking element DBs (811 and 813 of FIG. 8A) of 'Chicken' and 'Soup' that are the identified cooking elements.

Also, the recipe server 2000 may generate cooking method relevance data 827 of 'Chicken'+'Soup' by summing a cooking method relevance in the related cooking element DB 811 of 'Chicken' and a cooking method relevance in the related cooking element DB 813 of 'Soup'.

More specifically, for example, the recipe server 2000 may calculate a relevance between 'Chicken'+'Soup' and 'boil' as 98427 by summing a relevance of 'boil' in the related cooking element DB 811 of 'Chicken' and a relevance of 'boil' in the related cooking element DB 813 of 'Soup', and store the calculated relevance as a cooking method relevance of 'Chicken'+'Soup' corresponding to 'boil'.

Also, the recipe server 2000 may set a recommended cooking method 825 based on the generated cooking method data 827. For example, in the case in which a relevance between 'Chicken'+'Soup' and 'boil' is obtained as 98427, a relevance between 'Chicken'+'Soup' and 'Fry' is obtained as 38427, a relevance between 'Chicken'+'Soup' and 'stir' is obtained as 33293, and a relevance between 'Chicken'+'Soup' and 'Grill' is obtained as 33311 from the cooking method data 827 of 'Chicken'+'Soup', the recipe server 2000 may set at least one cooking method (for example, 'boil', 'fry', 'grill', and 'stir') having a high relevance to a recommended cooking method. Also, the recipe server 2000 may transmit the at least one cooking method set to the recommended cooking method to the electronic apparatus 1000.

Referring to FIG. 8B, according to reception of a user input of selecting the cooking method selection menu 440, the electronic apparatus 1000 may display a cooking method object 820 for inputting a cooking method in the module object 810 of 'GrandmaChickenSoup', and display the at least one recommended cooking method 825 received from the recipe server 2000.

Figure 8C:
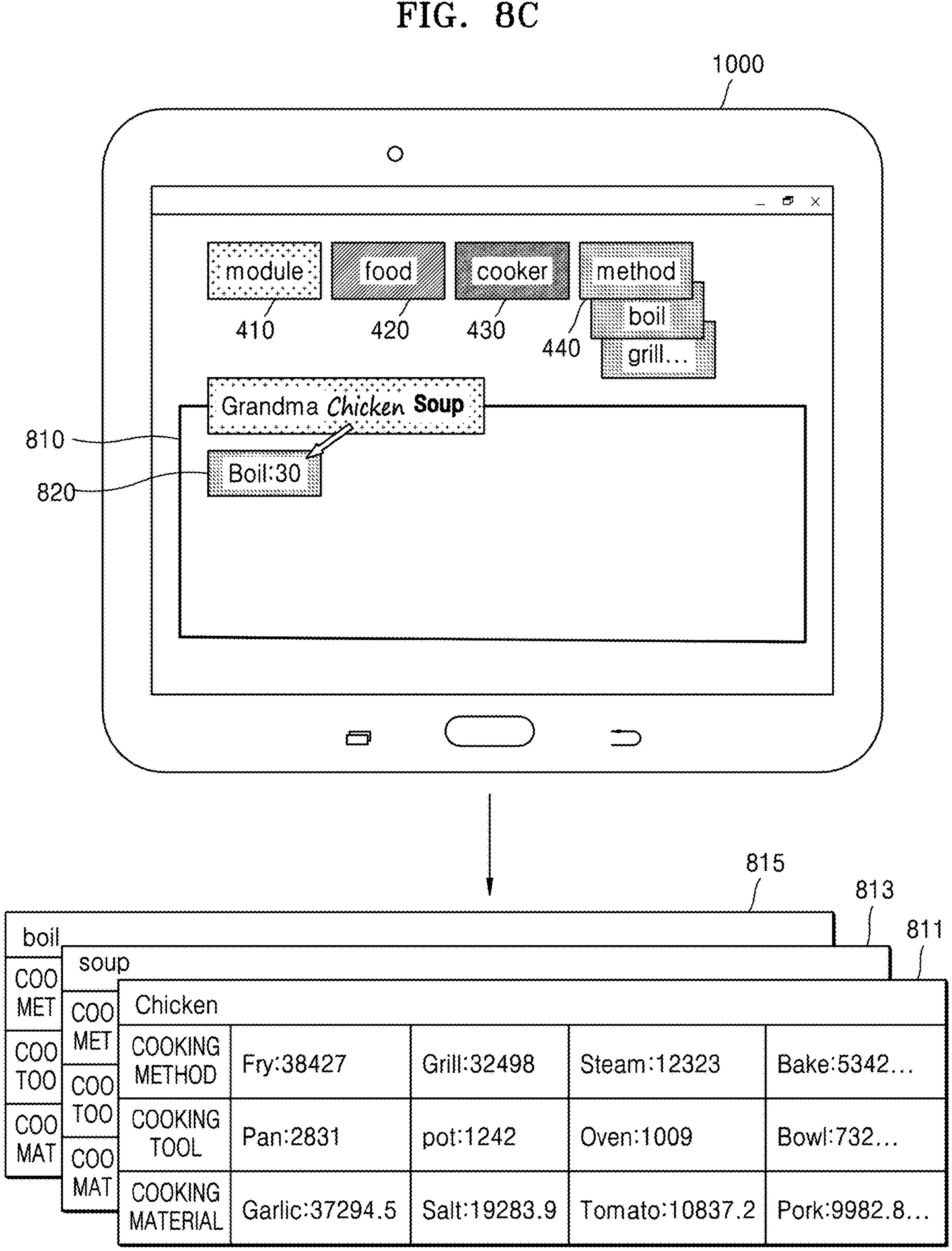

Referring to FIG. 8C, according to reception of a user input of selecting 'boil' from the recommended cooking method and inputting 30 minutes as a cooking time, the electronic apparatus 1000 may store 'boil:30' as a cooking method of first single cooking operation data in the recipe module. Also, the electronic apparatus 1000 may transmit 'boil:30' as the cooking method of the first single cooking operation data in the recipe module to the recipe server 2000.

Figure 8D:
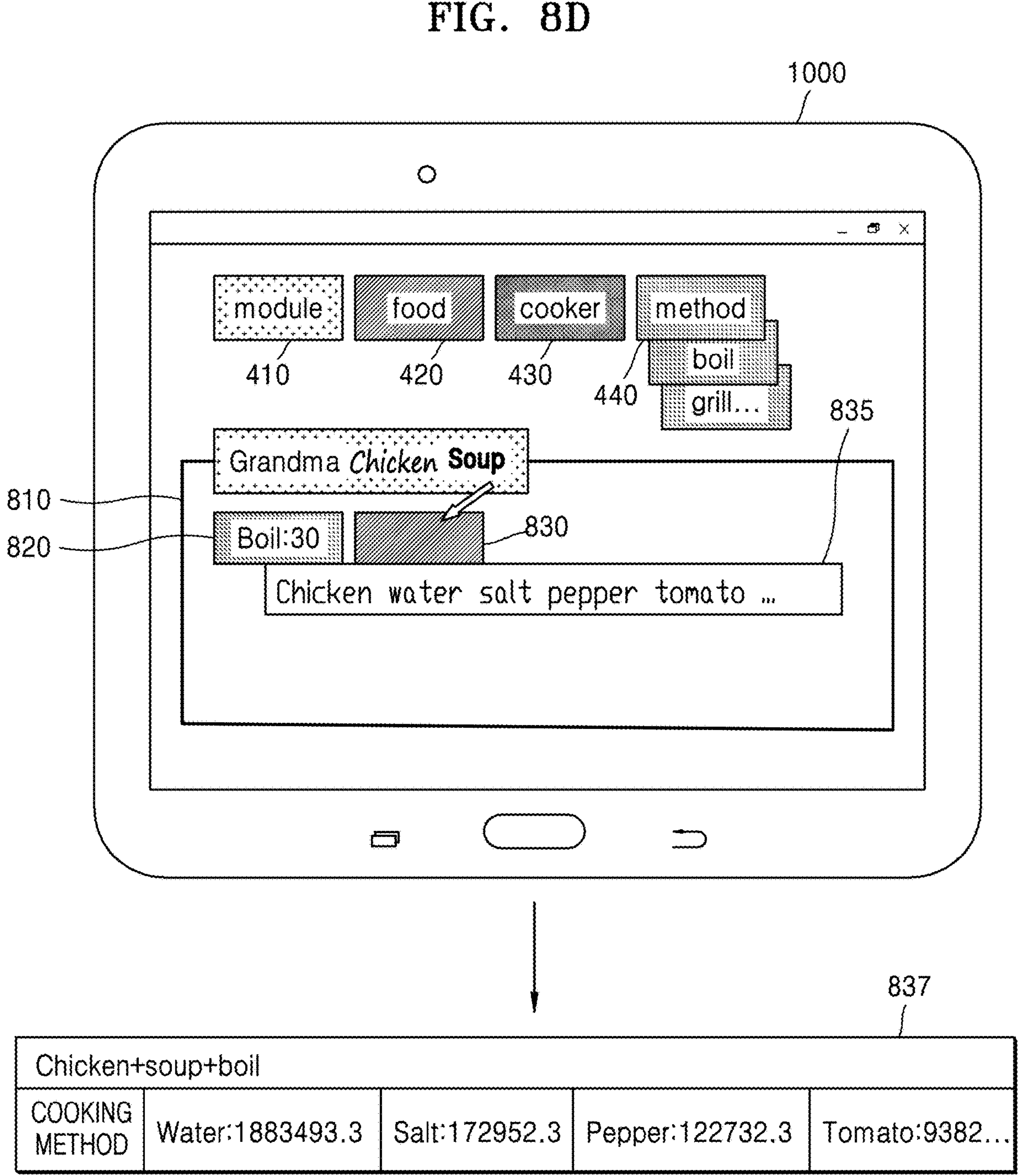
Figure 8E:
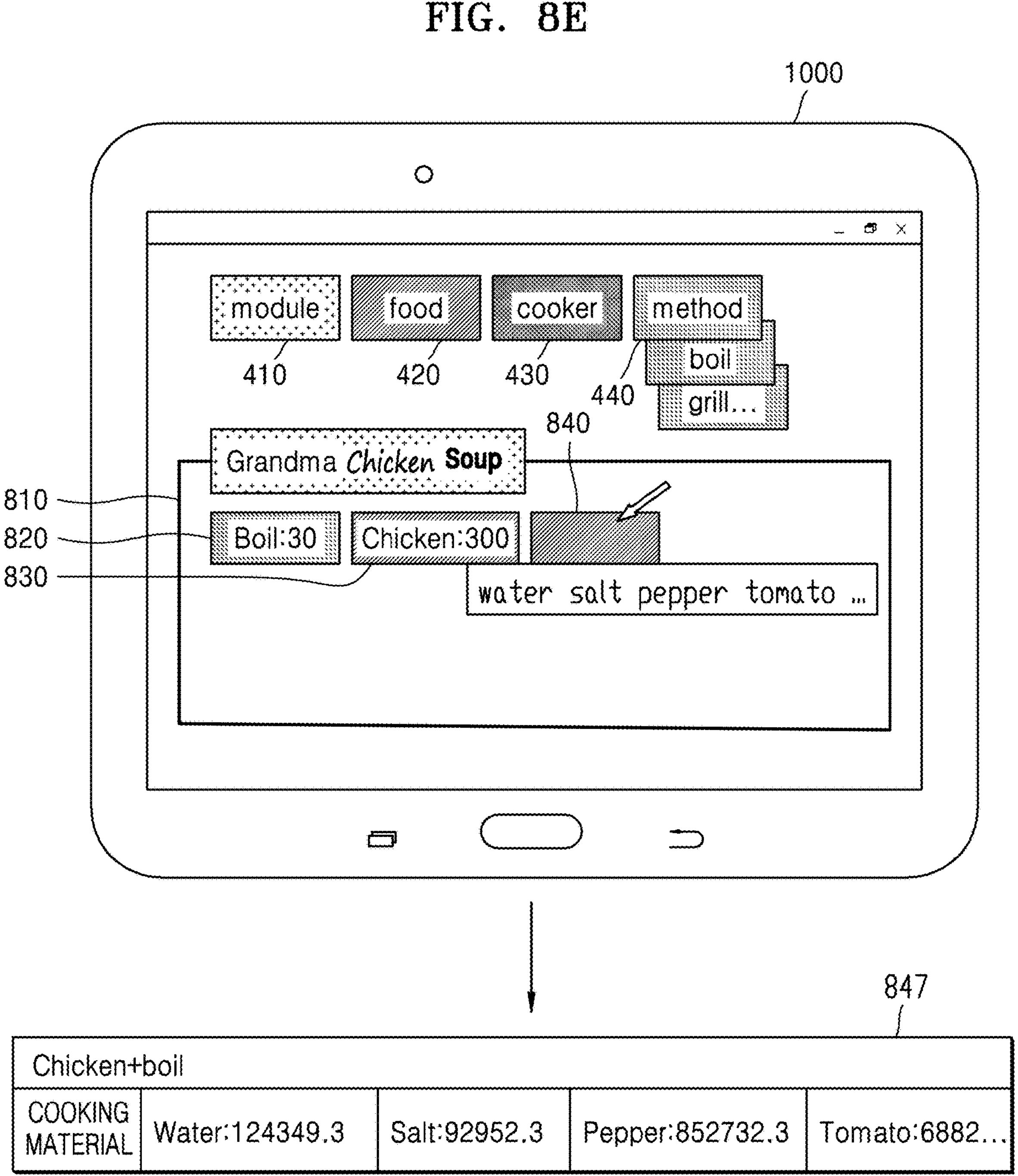

Referring to FIG. 8D, according to reception of a user input of selecting the cooking material selection menu 420, the electronic apparatus 1000 may request the recipe server 2000 for at least one recommended cooking material.

According to reception of the request for at least one recommended cooking material, the recipe server 2000 may obtain the related cooking element DB (811 of FIG. 8C) of 'Chicken', the related cooking element DB 813 of 'Soup', and the related cooking element DB (815 of FIG. 8C) of 'boil'. Also, the recipe server 2000 may calculate cooking material relevance data 837 of 'Chicken'+'Soup'+'boil' by summing a cooking material relevance in the related cooking element DB (811 of FIG. 8C) of 'Chicken', a cooking material relevance in the related cooking element DB 813 of 'Soup', and a cooking material relevance in the related cooking element DB 815 of 'boil', and set 'Water', 'Salt', 'Pepper', and 'Tomato' to recommended cooking materials based on the calculated cooking material relevance data 837.

Also, the recipe server 2000 may transmit 'Water', 'Salt', 'Pepper', and 'Tomato' set to the recommended cooking materials to the electronic apparatus 1000.

Also, the electronic apparatus 1000 may display a cooking material object 830 for inputting a cooking material in the module object 810 of 'GrandmaChickenSoup', and display at least one recommended cooking material 835 received from the recipe server 2000.

According to an embodiment, upon an input of a first cooking material, the electronic apparatus 1000 may display a cooking material (for example, 'Chicken' of FIG. 8D) extracted from a name of the recipe, prior to the recommended cooking material. Referring to FIG. 8D, the electronic apparatus 1000 may first display 'Chicken' extracted from the name of the recipe, prior to 'Water', 'Salt', 'Pepper', and 'Tomato' that are the recommended cooking materials.

According to reception of a user input of selecting 'Chicken' as a first cooking material, the electronic apparatus 1000 may store 'Chicken' as a first cooking material of the first single cooking operation data. Also, the electronic apparatus 1000 may transmit 'Chicken' as the first cooking material of the first single cooking operation data to the recipe server 2000.

Referring to FIG. 9E, according to reception of a user input for selecting a second cooking material, the electronic apparatus 1000 may request the recipe server 2000 for at least one recommended cooking material.

The recipe server 2000 may set a recommended cooking material based on the related cooking element DBs of a cooking method (for example, 'Boil' of FIG. 8E) and a cooking material (for example, 'Chicken' of FIG. 8E) input in advance on a line to which a cooking material is to be input, except for a cooking material (for example, 'Chicken' of FIG. 8E) and a cooking result (for example, 'Soup' of FIG. 8E) extracted from the name of the recipe.

For example, the recipe server 2000 may calculate cooking material relevance data 847 of 'Chicken'+'boil' by summing the related cooking element DBs (811 and 815 of FIG. 8) of the cooking method 'boil' and the cooking material 'Chicken' on the line to which the second cooking material is to be input.

Also, the recipe server 2000 may set recommended cooking materials in the order of higher relevances with 'Chicken'+'boil'. For example, the recipe server 2000 may set recommended cooking materials in the order of 'water', 'salt', 'pepper', and 'tomato'. The recipe server 2000 may transmit 'water', 'salt', 'pepper', and 'tomato' set to the recommended cooking materials to the electronic apparatus 1000. The electronic apparatus 1000 may display the received 'water', 'salt', 'pepper', and 'tomato' as recommended cooking materials.

Figure 8F:
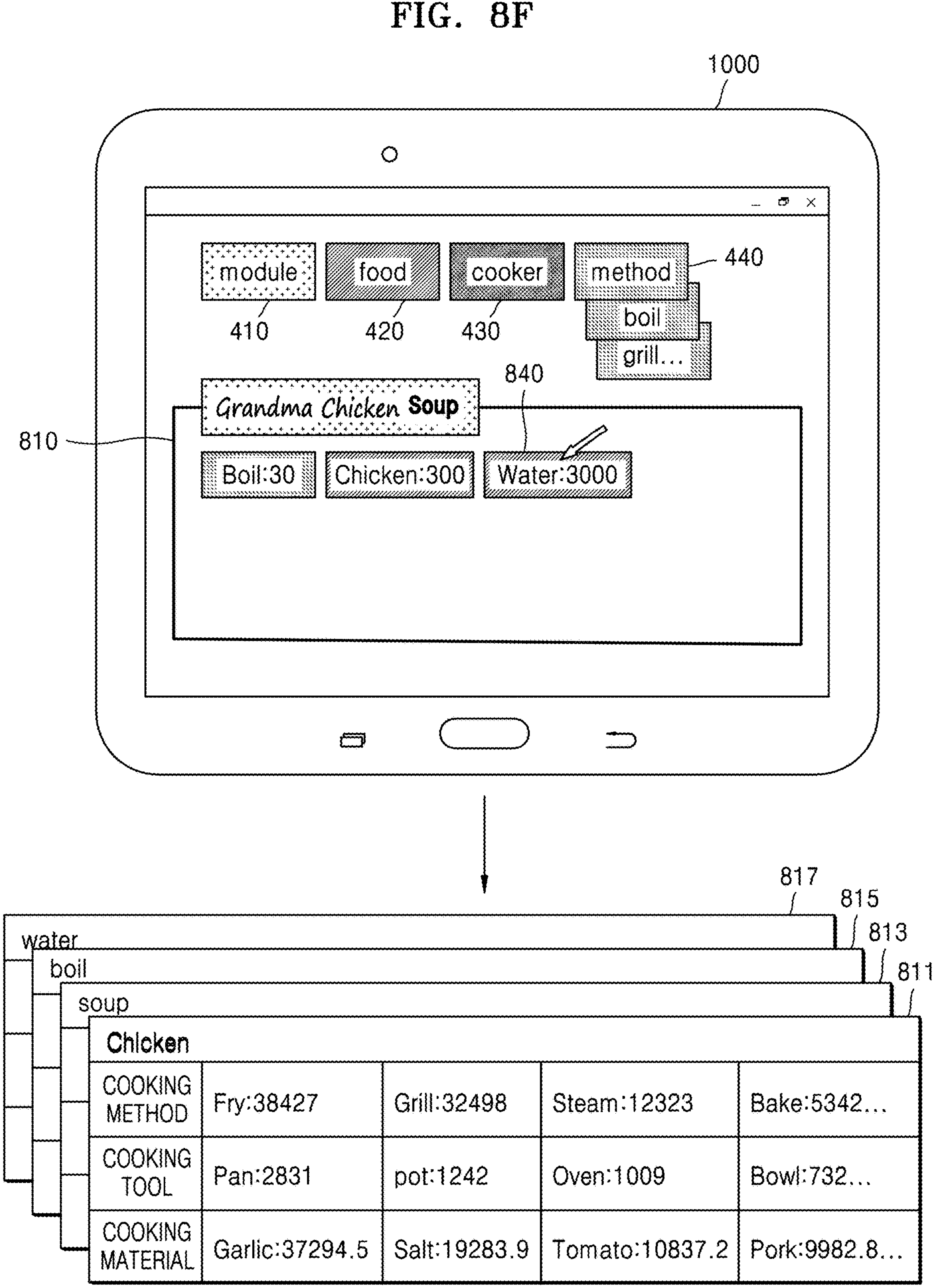

Referring to FIG. 8F, according to reception of a user input of selecting 'water' as a second cooking material, the electronic apparatus 1000 may store 'water' as a second cooking material of the first single cooking operation information. Also, the electronic apparatus 1000 may transmit 'water' as the second cooking material of the first single cooking operation information to the recipe server 2000.

Also, the recipe server 2000 may obtain the related cooking element DB 811 of 'Chicken', the related cooking element DB 813 of 'Soup', the related cooking element DB 815 of 'boil', and a related cooking element DB 817 of 'water'.

Figure 8G:
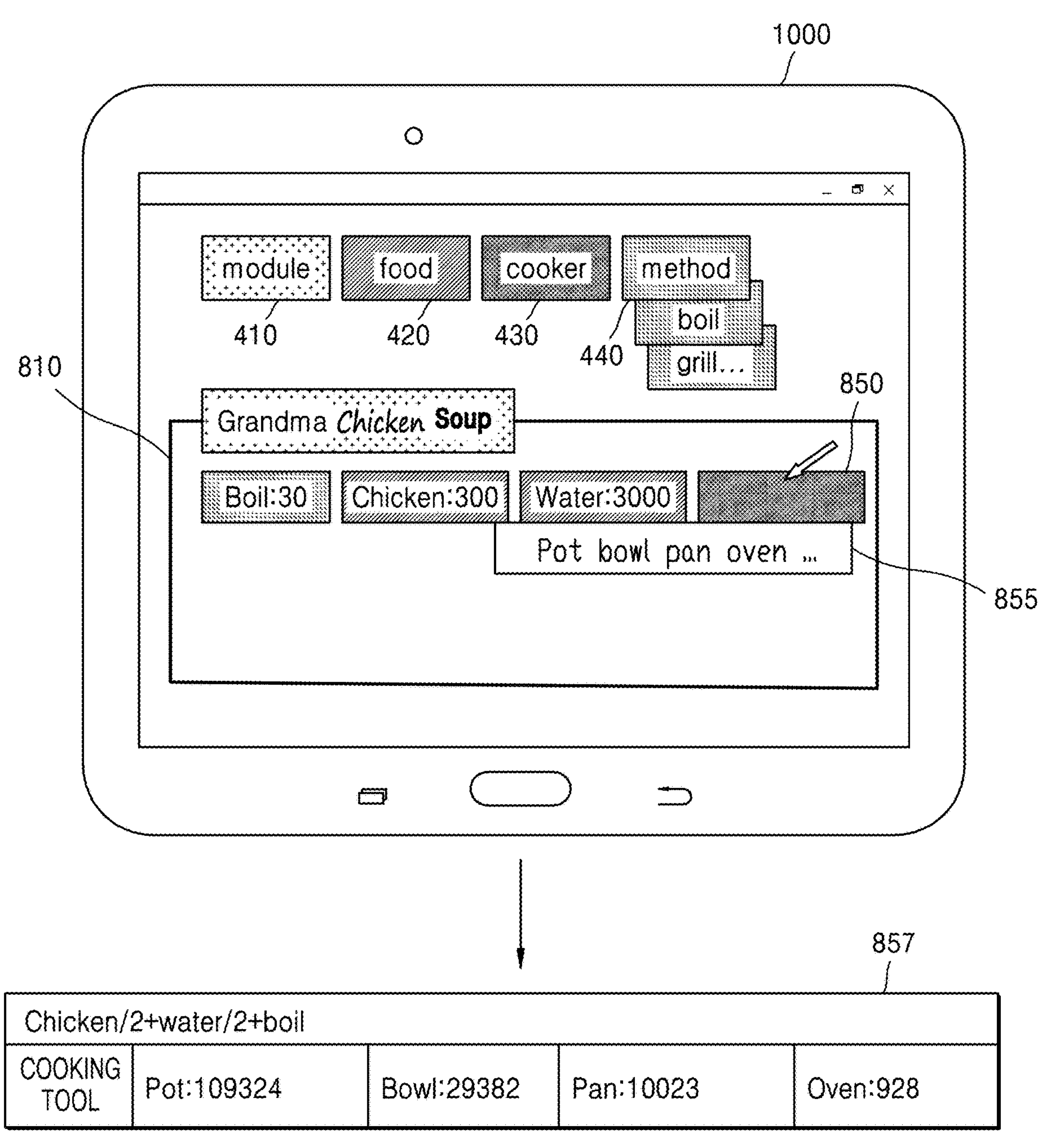

Referring to FIG. 8G, according to reception of a user input of selecting the cooking tool selection menu 430, the electronic apparatus 1000 may request the recipe server 2000 for at least one recommended cooking tool.

The electronic apparatus 1000 may display a cooking tool object 850 for inputting a cooking tool in the module object 810 of 'GrandmaChickenSoup'. The recipe server 2000 may set a recommended cooking tool based on the related cooking element DBs of the cooking method and cooking materials input in advance on a line to which a cooking tool is to be input.

For example, the recipe server 2000 may calculate cooking tool relevance data of 'Chicken'+'boil'+'Water' by summing a cooking tool relevance of the cooking method of 'boil' input in advance on the line to which the cooking tool is to be input and cooking tool relevances of the cooking materials of 'Chicken' and 'Water' input in advance.

Also, according to an embodiment, as disclosed in FIG. 8G, the recipe server 2000 may calculate cooking tool relevance data 857 of 'Chicken/n'+'Water/n'+'boil' such that a cooking tool related to a cooking method has a higher relevance score than a cooking tool related to a cooking material. In this case, n may mean the number of cooking materials.

The recipe server 2000 may set 'Pot', 'bowl', 'pan', and 'oven' to recommended cooking tools based on the cooking tool relevance data 857 of 'Chicken/2'+'Water/2'+'boil', and transmit 'Pot', 'bowl', 'pan', and 'oven' set to the recommended cooking tools to the electronic apparatus 1000.

The electronic apparatus 1000 may display at least one recommended cooking tool 855.

Figure 8H:
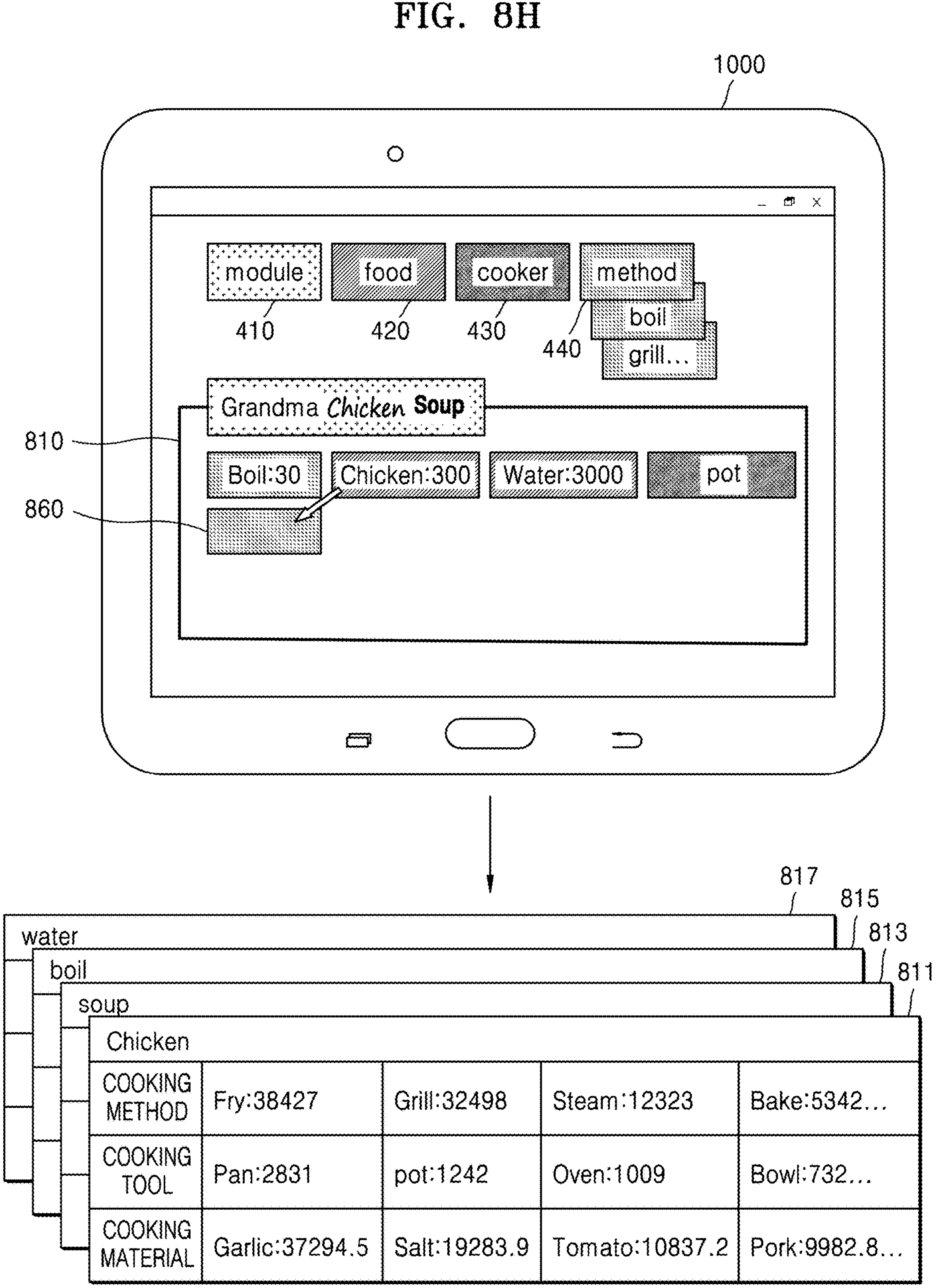

Referring to FIG. 8H, according to reception of a user input of selecting 'pot', the electronic apparatus 1000 may store 'pot' as a cooking tool of the first single cooking operation data, and transmit 'pot' as the cooking tool of the first single cooking operation data to the recipe server 2000.

Also, according to reception of a user input of selecting the cooking method selection menu 440, the electronic apparatus 1000 may display a cooking method object 860 on a second line in the recipe module.

Also, according to reception of a user input of selecting the cooking method selection menu 440, the electronic apparatus 1000 may display at least one cooking method based on the related cooking element DBs of the cooking materials and cooking method (for example, 'Chicken', 'soup', 'boil', and 'Water' of FIG. 8H) input in advance.

Also, according to reception of a user input of inputting a cooking method, the electronic apparatus 1000 may store the input cooking method as a cooking method of second single cooking operation data.

Figure 9:
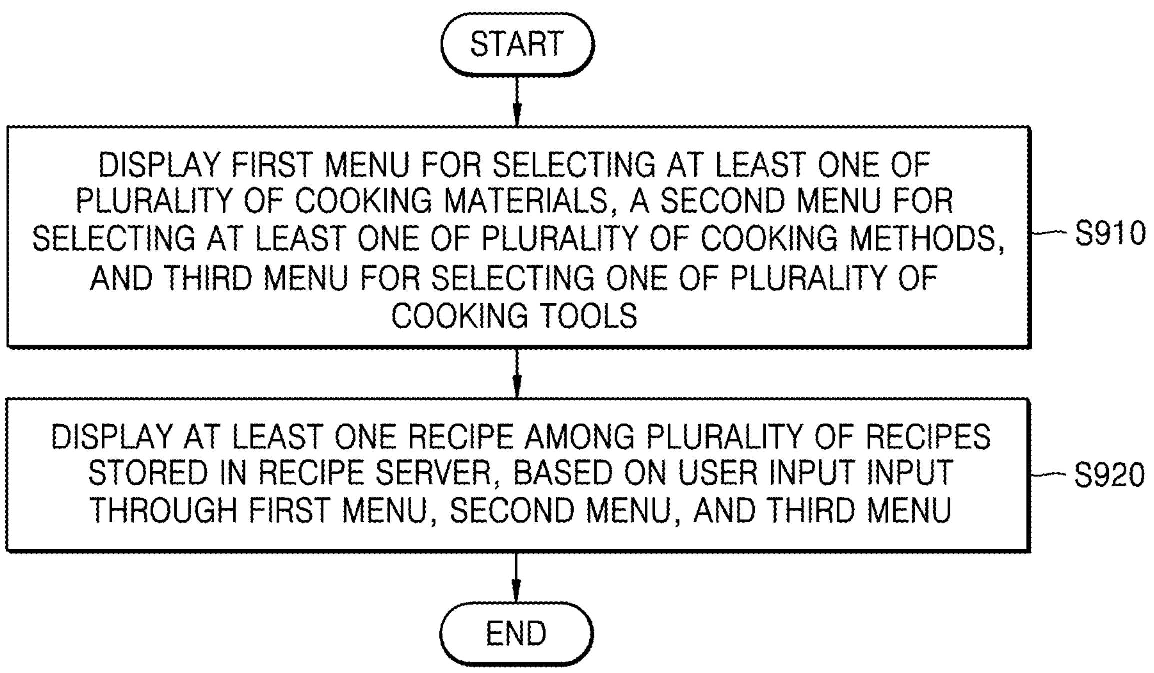
FIG. 9 is a flowchart illustrating a method of providing a recipe search user interface (UI) in an electronic apparatus, according to an embodiment of the present disclosure.

FIG. 9 is a flowchart illustrating a method of providing a recipe search user interface UI in an electronic apparatus, according to an embodiment of the present disclosure.

In operation S910, the electronic apparatus 1000 may display a first menu for selecting at least one of a plurality of cooking materials, a second menu for selecting at least one of a plurality of cooking methods, and a third menu for selecting at least one of a plurality of cooking tools.

In operation S920, the electronic apparatus 1000 may display at least one recipe among a plurality of recipes stored in a recipe server, based on a user input input through the first menu, the second menu, and the third menu.

For example, the electronic apparatus 1000 may request the recipe server 2000 for at least one recipe including a cooking material input through the first menu, a cooking method input through the second menu, and a cooking tool input through the third menu, among a plurality of recipes.

The recipe server 2000 may obtain the at least one recipe including the cooking material input through the first menu, the cooking method input through the second menu, and the cooking tool input through the third menu from the recipe DB 2700, and transmit the obtained recipe to the electronic apparatus 1000.

Also, according to another embodiment, the electronic apparatus 1000 may display a menu for inputting two or more unit cooking processes, and request the recipe server 2000 for at least one recipe including unit cooking processes input through the menu among the plurality of recipes based on the unit cooking processes.

The recipe server 2000 may obtain at least one recipe including the input unit cooking processes from the recipe DB 2700, and transmit the obtained recipe to the electronic apparatus 1000.

Figure 10:
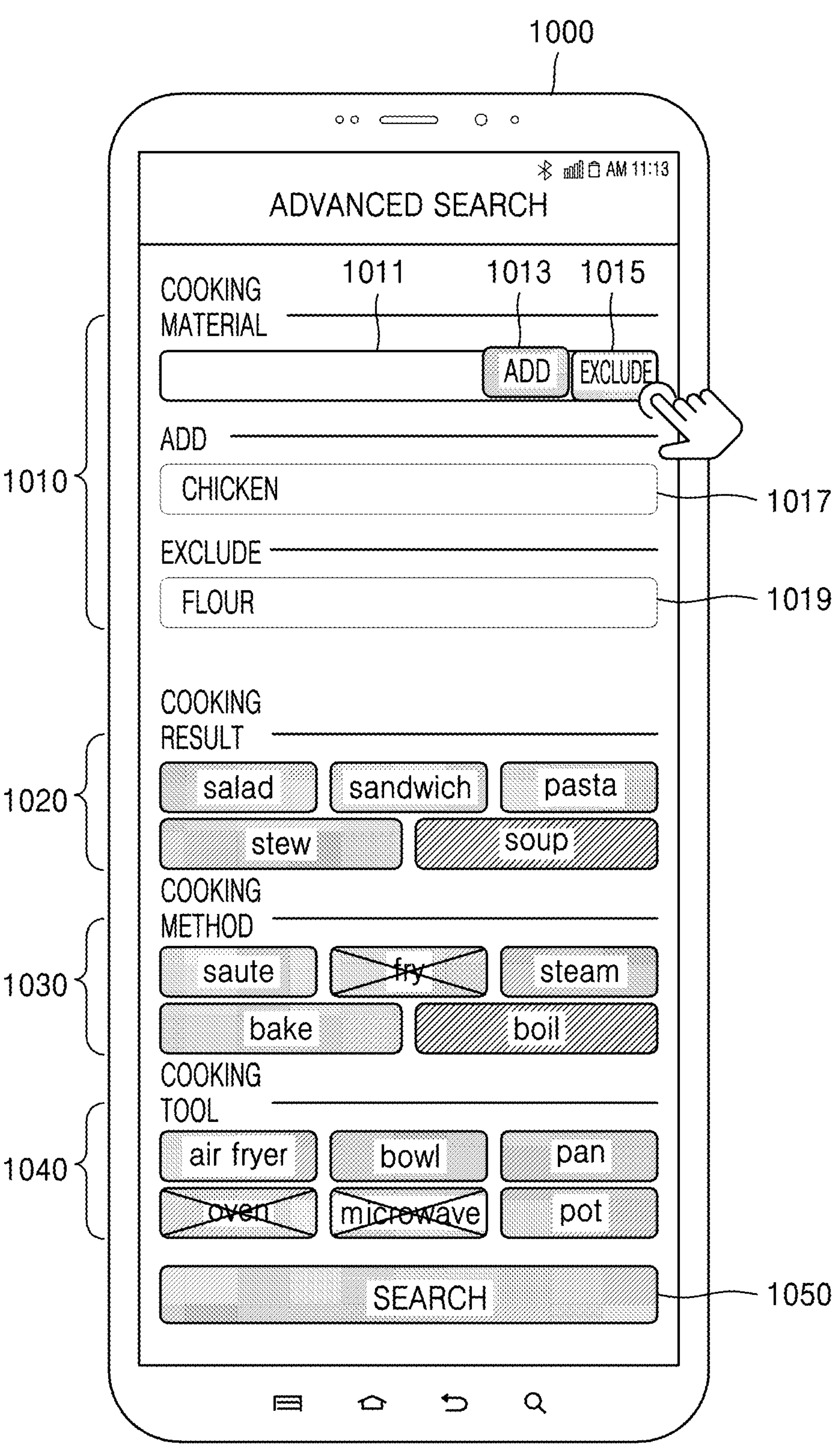
FIG. 10 illustrates a method of providing a recipe search UI in an electronic apparatus, according to an embodiment of the present disclosure.

Also, the electronic apparatus 1000 may display the at least one received recipe. FIG. 10 illustrates a method of providing a recipe search UI in an electronic apparatus, according to an embodiment of the present disclosure.

Referring to FIG. 10, according to an embodiment, the electronic apparatus 1000 may provide a UI for selecting a cooking element in correspondence to each of a plurality of cooking element types, and provide a recipe search UI for providing a recipe including cooking elements selected by a user.

Also, according to an embodiment, the electronic apparatus 1000 may provide a UI for excluding a cooking element, as well as the UI for selecting a cooking element, and provide a search UI for providing a recipe including a selected cooking element and not including an excluded cooking element.

The electronic apparatus 1000 may display a cooking material selection UI 1010 for inputting a cooking material to be searched or a cooking material to be excluded. For example, according to reception of a user input of inputting 'chicken' to a cooking material search window 1011 and pressing an ADD button 1013, the electronic apparatus 1000 may add 'chicken' to a search cooking material list 1017. Also, according to reception of a user input of inputting 'flour' to the cooking material search window 1011 and pressing an EXCLUDE button 1015, the electronic apparatus 1000 may add 'flour' to an excluded cooking material list 1019.

Also, the electronic apparatus 1000 may display a cooking result selection UI 1020. For example, the electronic apparatus 1000 may display a UI for selecting or excluding a cooking result, such as salad, sandwich, pasta, stew, and soup. According to reception of a user input of selecting 'soup' from among cooking results, the electronic apparatus 1000 may set 'soup' to a search keyword for cooking result.

Also, the electronic apparatus 1000 may display a cooking method selection UI 1030. For example, the electronic apparatus 1000 may display a button for selecting or excluding a cooking method, such as 'saute', 'fry', 'steam', 'bake', and 'boil'. According to reception of a user input of selecting 'boil' from among cooking methods and excluding 'fry', the electronic apparatus 1000 may set 'boil' to a search keyword for cooking method and 'fry' to an exclusion keyword for cooking method.

Also, the electronic apparatus 1000 may display a cooking tool selection UI 1040. For example, the electronic apparatus 1000 may display a button for selecting or excluding a cooking tool, such as 'air fryer', 'bowl', 'pan', 'oven', 'microwave', and 'pot'. According to reception of a user input of excluding 'oven' and 'microwave' from cooking tools, the electronic apparatus 1000 may set 'oven' and 'microwave' to exclusion keywords for cooking tool.

Also, according to reception of a user input of pressing a SEARCH button 1050, the electronic apparatus 1000 may search for a recipe according to the search keyword and exclusion keywords. For example, the electronic apparatus 1000 may request the recipe server 2000 for at least recipe that includes 'chicken' as cooking materials while not including 'flour', includes 'boil' as cooking methods while not including 'fry', does not include 'oven' and 'microwave' as cooking tools, and includes 'soup' as cooking results, among the plurality of recipes stored in the recipe DB 2700.

According to reception of at least one recipe from the recipe server 2000, the electronic apparatus 1000 may display the at least one received recipe.

Figure 11:
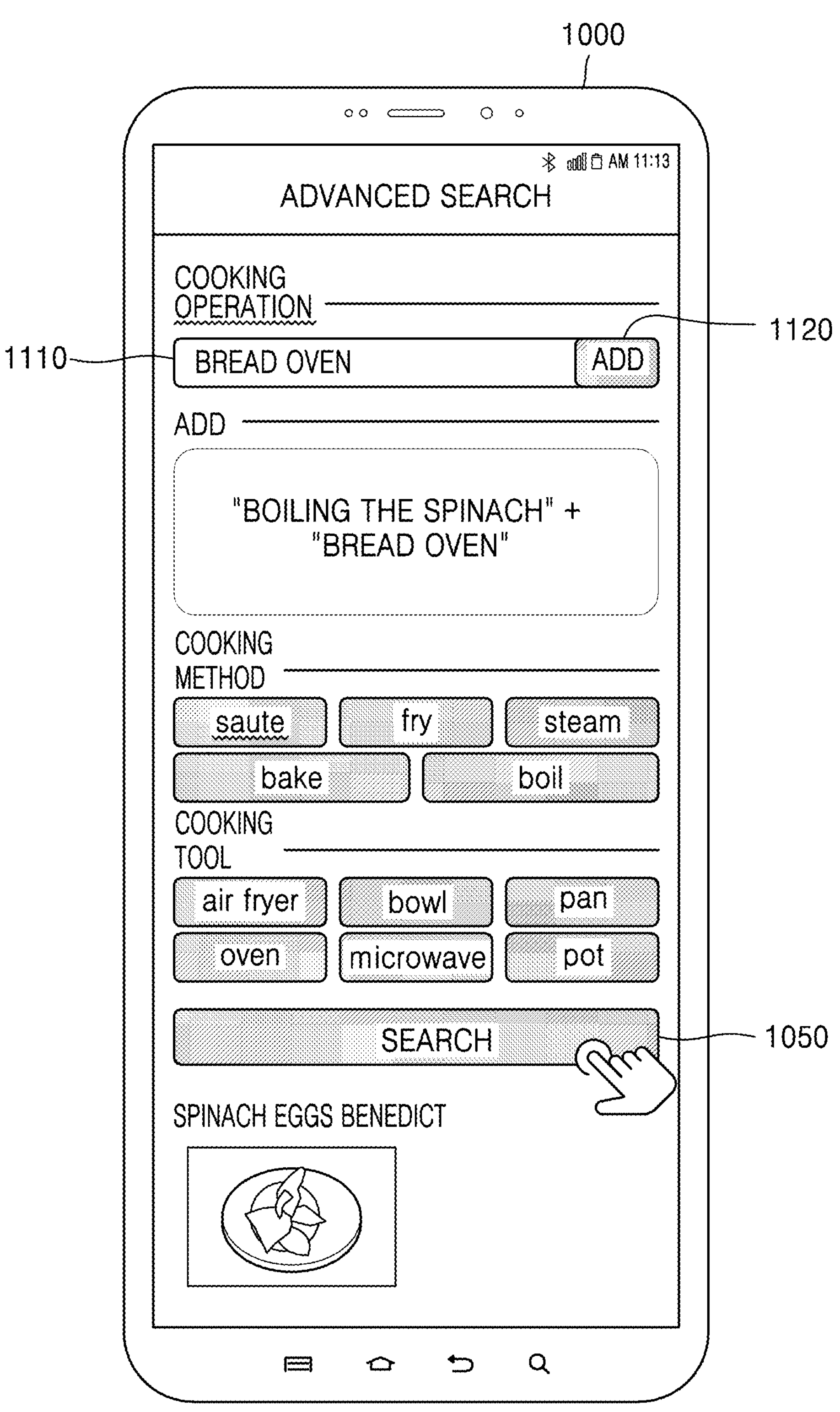
FIG. 11 illustrates a method of providing a recipe search UI in an electronic apparatus, according to another embodiment of the present disclosure.

FIG. 11 illustrates a method of providing a recipe search UI in an electronic apparatus, according to another embodiment of the present disclosure.

Referring to FIG. 11, the electronic apparatus 1000 may provide a cooking operation input UI for inputting at least one cooking operation, and provide a search UI for searching for a recipe based on at least one input cooking operation.

For example, according to reception of a user input of inputting 'boiling the spinach' to a cooking operation input window 1110 and pressing an ADD button 1120 and a user input of inputting 'bread oven' and pressing the ADD button 1120, and reception of a user input of pressing the SEARCH button 1050, the electronic apparatus 1000 may obtain at least one recipe that includes 'spinach' and 'boiling' as single cooking operation data and includes 'bread' and 'oven' as single cooking operation data, from among the plurality of recipes stored in the database, and provide the at least one recipe. For example, in the case in which a recipe 'Spinach Eggs Benedict' includes 'saute:2m spinach;' as first single cooking operation data and 'put bread oven' as second single cooking operation data, the electronic apparatus 1000 may provide the recipe 'Spinach Eggs Benedict' as a searched recipe.

Figure 12:
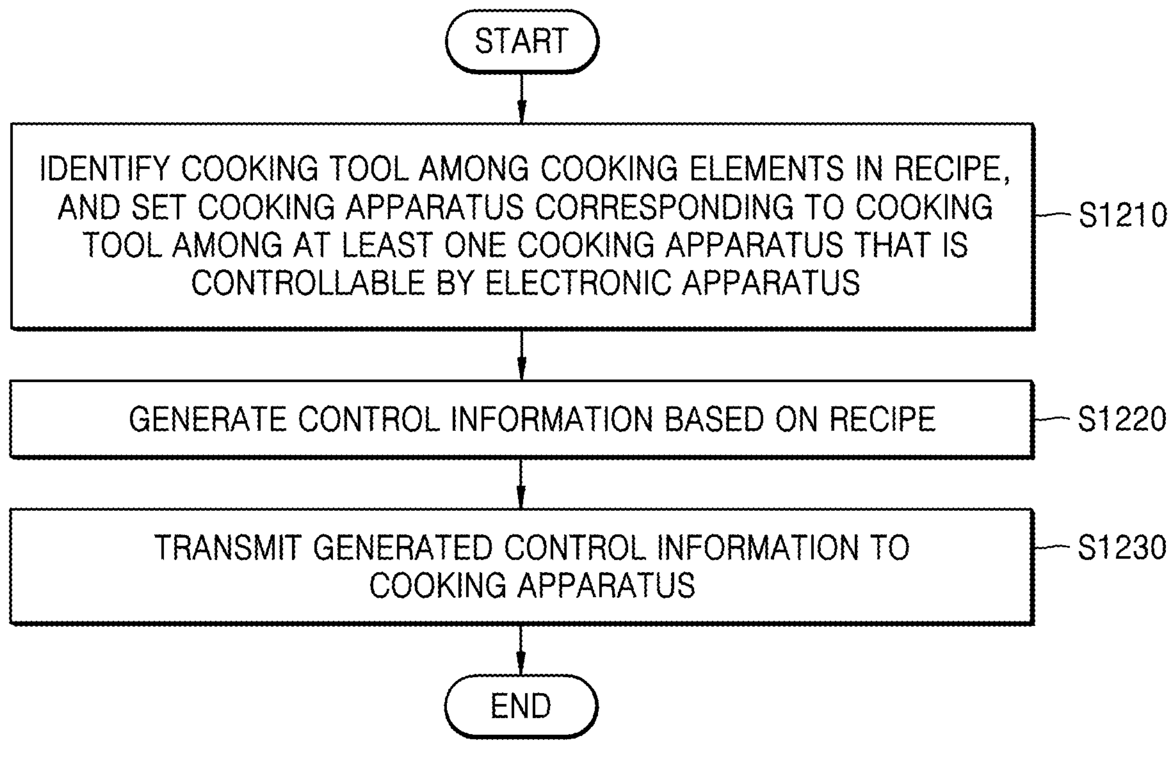
FIG. 12 is a flowchart illustrating a method of controlling a cooking tool based on a recipe in an electronic apparatus, according to an embodiment of the present disclosure.

FIG. 12 is a flowchart illustrating a method of controlling a cooking tool based on a recipe in an electronic apparatus, according to an embodiment of the present disclosure.

In operation S1210, the electronic apparatus 1000 may identify a cooking tool among cooking elements in a recipe, and set a cooking apparatus corresponding to the cooking tool among at least one cooking apparatus that is controllable by the electronic apparatus 1000.

In operation S1220, the electronic apparatus 1000 may generate control information based on the recipe.

According to an embodiment, the electronic apparatus 1000 may display identification information of the set cooking apparatus and a UI object for driving the cooking apparatus, together with recipe information. Also, according to reception of a user input of driving the cooking apparatus through the UI object, the electronic apparatus 1000 may generate control information based on the recipe.

In operation S1230, the electronic apparatus 1000 may transmit the generated control information to the cooking apparatus.

According to an embodiment, the electronic apparatus 1000 may receive state information of the cooking apparatus from the cooking apparatus. Also, the electronic apparatus 1000 may display the received state information together with the recipe information.

Figure 13:
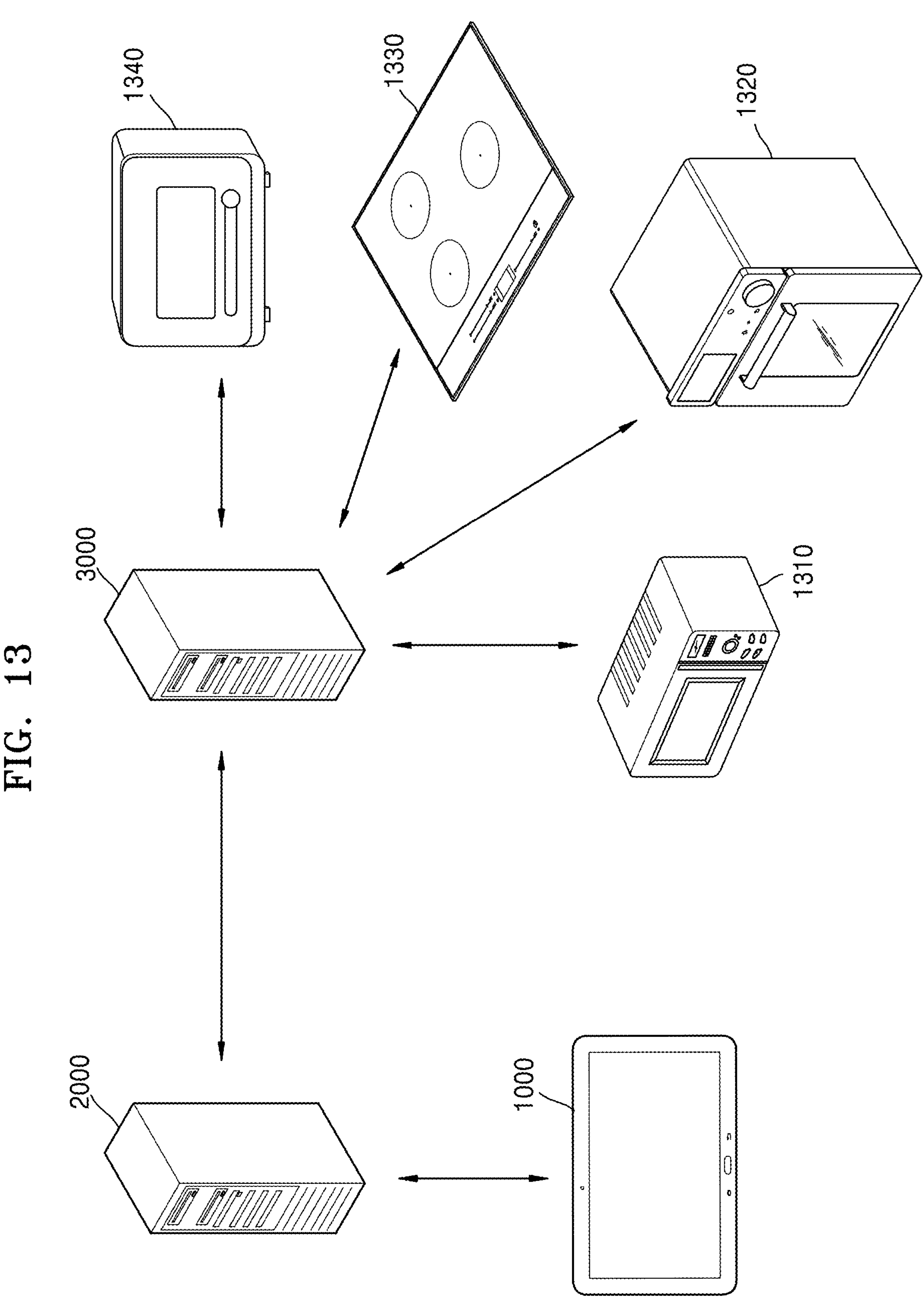
FIG. 13 illustrates a method of transmitting/receiving data to/from a cooking apparatus in an electronic apparatus, according to an embodiment of the present disclosure.

FIG. 13 illustrates a method of transmitting/receiving data to/from a cooking apparatus in an electronic apparatus, according to an embodiment of the present disclosure.

Referring to FIG. 13, the electronic apparatus 1000 may transmit/receive data to/from at least one cooking apparatus.

The at least one cooking apparatus may be registered in a first server 3000. The first server 3000 may be an apparatus that performs a function of transmitting control information to the cooking apparatus at home based on a first user account or transmitting state information of the cooking apparatus to another registered server or the electronic apparatus 1000. The cooking apparatus may include a microwave 1310, an oven 1320, an induction range 1330, and a Cooker™ 1340, although not limited thereto.

For example, according to reception of a user input for controlling the cooking apparatus from the electronic apparatus 1000, the first server 3000 may transmit a control command to the cooking apparatus based on the first user account registered therein and address information of the cooking apparatus. Also, the first server 3000 may receive state information of the cooking apparatus from the cooking apparatus, and transmit the received state information to the electronic apparatus 1000 based on the first user account and the address information of the electronic apparatus 1000.

Also, the first server 3000 may manage information about various apparatuses on a home network connected to an access point at home. The first server 3000 may also be referred to as an Internet of Things (IoT) server or a smart home server.

Also, the electronic apparatus 1000 may be registered in the second server 2000 based on a second user account. The second server 2000 may provide recipe information to the electronic apparatus 1000, and relay information related to recipes between the electronic apparatus 1000 and another server. According to an embodiment, the recipe server 2000 may include the second server 2000.

For example, according to reception of a user input for controlling the induction range 1330 registered in the first server 3000, the electronic apparatus 1000 may transmit second user account information, identification information of the induction range 1330, and control information for the induction range 1330 to the second server 2000. The second server 2000 may transmit the identification information of the induction range 1330, the control information for the induction range 1330, and first user account information to the first server 3000, based on the first user account information and the address information of the first server 3000, stored to correspond to the second user account information.

According to reception of the identification information of the induction range 1330, the control information for the induction range 1330, and the first user account information from the second server 2000, the first server 3000 may obtain address information of the induction range 1330 based on the first user account information and the identification information of the induction range 1330, and transmit the control information to the induction range 1330 based on the obtained address information of the induction range 1330.

According to reception of the control information from the first server 3000, the induction range 1330 may be driven or stop based on the control information.

Also, according to driving of the induction range 1330, the induction range 1330 may transmit state information of the induction range 1330 to the first server 3000. The first server 3000 may transmit the state information of the induction range 1330 to the second server 2000, as a response to the control information for the induction range 1330. According to reception of the state information of the induction range 1330 from the first server 3000, the second server 2000 may transfer the state information of the induction range 1330 to the electronic apparatus 1000. Accordingly, the electronic apparatus 1000 may display the received state information of the induction range 1330.

According to an embodiment, the first server 3000 and the second server 2000 may be implemented as a single third server.

Also, according to an embodiment, the first user account and the second user account may be the same user account.

According to another embodiment, the electronic apparatus 1000 may communicate with the cooking apparatuses 1310, 1320, 1330, and 1340 not via the servers 2000 and 300. For example, the electronic apparatus 1000 may directly communicate with the cooking apparatuses 1310, 1320, 1330, and 1340 through short-range communication (for example, Near Field Communication (NFC), Bluetooth Low Energy (BLE), Bluetooth, Ultra WideBand (UWB), or ZigBee). Also, the electronic apparatus 1000 may directly communicate with the cooking apparatuses 1310, 1320, 1330, and 1340 through WiFi direct, or may communicate with the cooking apparatuses 1310, 1320, 1330, and 1340 through an access point (AP) to which the cooking apparatuses 1310, 1320, 1330, and 1340 are connected.

The electronic apparatus 1000 may receive cooking apparatus information directly from the cooking apparatuses 1310, 1320, 1330, and 1340, and receive state information of each cooking apparatus or notification information indicating that cooking has been completed. For example, the induction range 1330 may transfer, after completing a cooking operation according to the control information, notification information indicating cooking completion to the electronic apparatus 1000 through short-range communication (for example, BLE).

Figure 14:
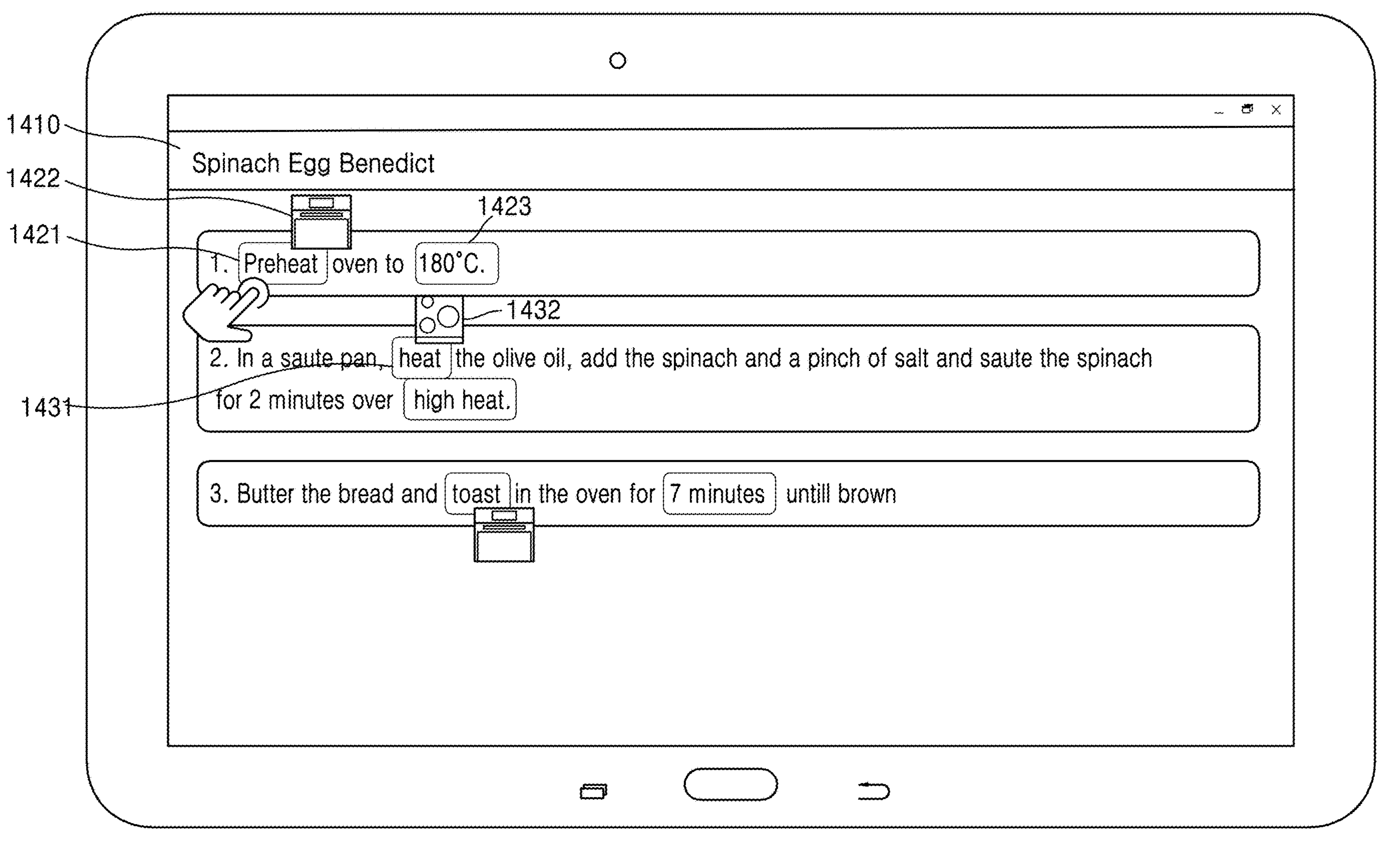
FIG. 14 illustrates a method of controlling a cooking apparatus based on a recipe in an electronic apparatus, according to an embodiment of the present disclosure.

FIG. 14 illustrates a method of controlling a cooking tool based on a recipe in an electronic apparatus, according to an embodiment of the present disclosure.

Referring to FIG. 14, the electronic apparatus 1000 may receive recipe information having a name 'Spinach Egg Benedict' from the second server (2000 of FIG. 13).

Also, the electronic apparatus 1000 may display the recipe information of 'Spinach Egg Benedict'.

Also, the electronic apparatus 1000 may identify a cooking tool from the received recipe information.

As an embodiment, according to identification of a cooking tool corresponding to a cooking tool type among a plurality of cooking element types from the recipe information, the electronic apparatus 1000 may identify cooking elements stored as cooking tool types as cooking tools from the recipe information.

For example, in the case in which the recipe information includes 'heat:high olive_oil:1T sautepan;' as single cooking operation data and a storage format of the single cooking operation data is a format that is stored in the order of 'cooking method cooking material cooking tool;', the electronic apparatus 1000 may identify 'sautepan' as a cooking tool.

Also, in the case in which the recipe information includes 'cooking method=heat:high cooking material=olive_oil:1T cooking tool=sautepan;' as single cooking operation data, the electronic apparatus 1000 may set 'sautepan' to a cooking tool. Also, for example, in the case in which the recipe information includes 'cooking method=preheat cooking tool=oven:180' as single cooking operation data, the electronic apparatus 1000 may set 'oven' to a cooking tool.

Also, according to another embodiment, by comparing the recipe information to pre-stored identification information of cooking tools, a cooking element having the same identification information may be set to a cooking tool. For example, in the case in which the recipe information has been stored in a format of a general natural language such as 'preheat oven to 180° C.', the electronic apparatus 1000 may identify 'oven' as a cooking tool from 'preheat oven to 180° C.' based on pre-stored identification information 'oven' of a cooking tool.

According to an embodiment, the electronic apparatus 1000 may set a cooking apparatus corresponding to the identified cooking tool among a plurality of cooking apparatuses.

For example, the electronic apparatus 1000 may set a first oven (1320 of FIG. 13) among the plurality of cooking apparatuses to a cooking apparatus corresponding to 'oven' to correspond to 'oven' identified from the recipe information. Also, the electronic apparatus 1000 may identify 'sautepan' as a cooking tool from the recipe information, and set an induction range among the plurality of cooking apparatuses to a cooking apparatus corresponding to 'sautepan'.

Referring to FIG. 14, the electronic apparatus 1000 may display recipe information 1410. According to an embodiment, the electronic apparatus 1000 may convert recipe information stored in a data format into a natural language sentence, and display the converted natural language sentence as the recipe information 1410. For example, the electronic apparatus 1000 may convert recipe information stored as 'heat:high olive_oil:1T sautepan;' into 'In a saute pan, heat the olive oil 1 table spoon over high heat.', and display the converted sentence as recipe information.

Also, as another embodiment, the recipe information may include a natural language sentence corresponding to recipe data. For example, the recipe information may include a natural language sentence 'In a saute pan, heat the olive oil 1Table spoon.' to correspond to single cooking operation data 'heat:high olive_oil:1T sautepan;'. In this case, the electronic apparatus 1000 may display the natural language sentence corresponding to the single cooking operation data as recipe information.

The electronic apparatus 1000 may display a UI object for controlling the set cooking apparatus together with the recipe information. For example, the electronic apparatus 1000 may display a UI object 1421 for controlling the first oven (1320 of FIG. 13) set to correspond to the cooking tool 'oven', together with a word (for example, 'preheat') representing heating of the 'oven'. Also, identification information 1422 of the set first oven (1320 of FIG. 13) may be displayed together with the UI object 1421 for controlling the first oven (1320 of FIG. 13). Also, for example, the electronic apparatus 1000 may display a UI object 1431 for controlling an induction range set to correspond to 'sautepan' as a cooking tool, together with a word (for example, 'heat') representing heating of 'sautepan'. Also, identification information 1432 of the set induction range may be displayed together with the UI object 1431 for controlling the induction range.

Also, according to reception of a user input of selecting a UI object for controlling a cooking apparatus, the electronic apparatus 1000 may generate control information for the cooking apparatus.

For example, according to reception of a user input of selecting the UI object 1421 to preheat the first oven (1320 of FIG. 13) corresponding to 'oven', the electronic apparatus 1000 may generate control information for preheating the first oven (1320 of FIG. 13) to 180 degrees based on 'cooking method=preheat cooking tool-oven:180' which is single cooking operation data for 'oven'.

Also, for example, according to reception of a user input of selecting the UI object 1421 to control the induction range corresponding to 'sautepan', the electronic apparatus 1000 may generate control information for driving the induction range to a high level based on 'heat:high olive_oil:1T sautepan;' which is single cooking operation data for 'sautepan'.

By generating the control information, the electronic apparatus 1000 may transmit the generated control information to the cooking apparatus. For example, the electronic apparatus 1000 may transmit the control information to the cooking apparatus through the second server 2000 and the first server 3000 of FIG. 13.

Also, according to another embodiment, in the case in which the first server 3000 and the second server 200 are implemented as a single second server 2000, the electronic apparatus 1000 may transmit the control information to the cooking apparatus through the second server 2000.

Also, according to another embodiment, the control information may be transmitted to a cooking apparatus directly connected to the electronic apparatus 1000 through short-range wireless communication.

By receiving the control information, the cooking apparatus may operate based on the received control information. For example, the first oven (1320 of FIG. 13) may heat inside temperature to 180 degrees.

Also, in an embodiment, according to reception of a user input of changing a setting of the cooking apparatus, the electronic apparatus 1000 may transmit changed setting information to the cooking apparatus.

For example, the electronic apparatus 1000 may identify a heating temperature, heating level, or heating time related to a cooking tool in recipe information, and display a UI object for changing the identified heating temperature, heating level, or heating time, together with the heating temperature, heating level, and heating time.

For example, a heating temperature of 'oven' may be identified as 180 degrees in recipe information, and a UI object 1423 for changing the heating temperature may be displayed together with the heating temperature. According to reception of a user input of changing 180 degrees to 190 degrees, the electronic apparatus 1000 may transmit control information for changing the heating temperature of the first oven corresponding to 'oven' to 190 degrees to the cooking apparatus.

FIG. 15 illustrates a method of displaying state information of a cooking apparatus together with recipe information in an electronic apparatus, according to an embodiment of the present disclosure.

Referring to FIG. 15, the electronic apparatus 1000 may receive state information of a cooking apparatus and display the received state information of the cooking apparatus together with recipe information.

The electronic apparatus 1000 may receive the state information of the cooking apparatus from the second server 2000 via the first server 3000 to which the cooking apparatus is connected. Also, according to an embodiment, the electronic apparatus 1000 may receive the state information of the cooking apparatus from the first server 3000 to which the cooking apparatus is connected, or receive the state information of the cooking apparatus directly from the cooking apparatus.

According to reception of an inside temperature of the first oven (1320 of FIG. 13) from the first oven (1320 of FIG. 13), the electronic apparatus 1000 may display the inside temperature of the first oven (1320 of FIG. 13) together with identification information 1422 of the first oven.

Also, the electronic apparatus 1000 may calculate a preheating progress state of the first oven (1320 of FIG. 13)

based on a heating temperature (for example, 180 degrees) in the recipe information and the received temperature, and display an image 1510 representing the calculated preheating progress state.

Also, the electronic apparatus 1000 may display a time remaining until heating terminates, based on a unit cooking process module, single cooking operation data, the heating time in the recipe module, and the state information of the cooking apparatus. For example, according to reception of a user input of selecting an UI object 1441 for controlling the first oven in correspondence to a cooking method 'toast' in single cooking operation data of FIG. 15, the electronic apparatus 1000 may transmit a heating time of 7 minutes to the first oven. According to reception of state information representing that heating for 7 minutes starts from the first oven, the electronic apparatus 1000 may display an elapsed time of heating or a time remaining until 7 minutes.

Also, the electronic apparatus 1000 may identify completion of a single cooking operation or a unit cooking process, based on the received state information of the cooking apparatus. For example, the electronic apparatus 1000 may calculate an elapsed driving time of the cooking apparatus based on the state information of the cooking apparatus, and identify completion of a single cooking operation or a unit cooking process according to the calculated, elapsed driving time reaching the heating time in the recipe information. Also, according to another example, in the case in which the state information of the cooking apparatus includes an inside temperature of the cooking apparatus, the electronic apparatus 1000 may identify completion of a single cooking operation or a unit cooking process according to the inside temperature of the cooking apparatus reaching the heating temperature in the recipe information.

For example, referring to FIG. 15, according to identification that an inside temperature of the first oven received from the first oven has reached the heating temperature, the electronic apparatus 1000 may display an image 1520 representing that a single cooking operation corresponding to 'preheat' has been completed.

As another example, referring to FIG. 15, according to reception of state information of the first oven representing that driving of the first oven has stopped as a result of an elapse of a setting time of 7 minutes from the first oven, the electronic apparatus 1000 may display an image representing that a single cooking operation corresponding to 'toast' has been completed.

Figure 16:
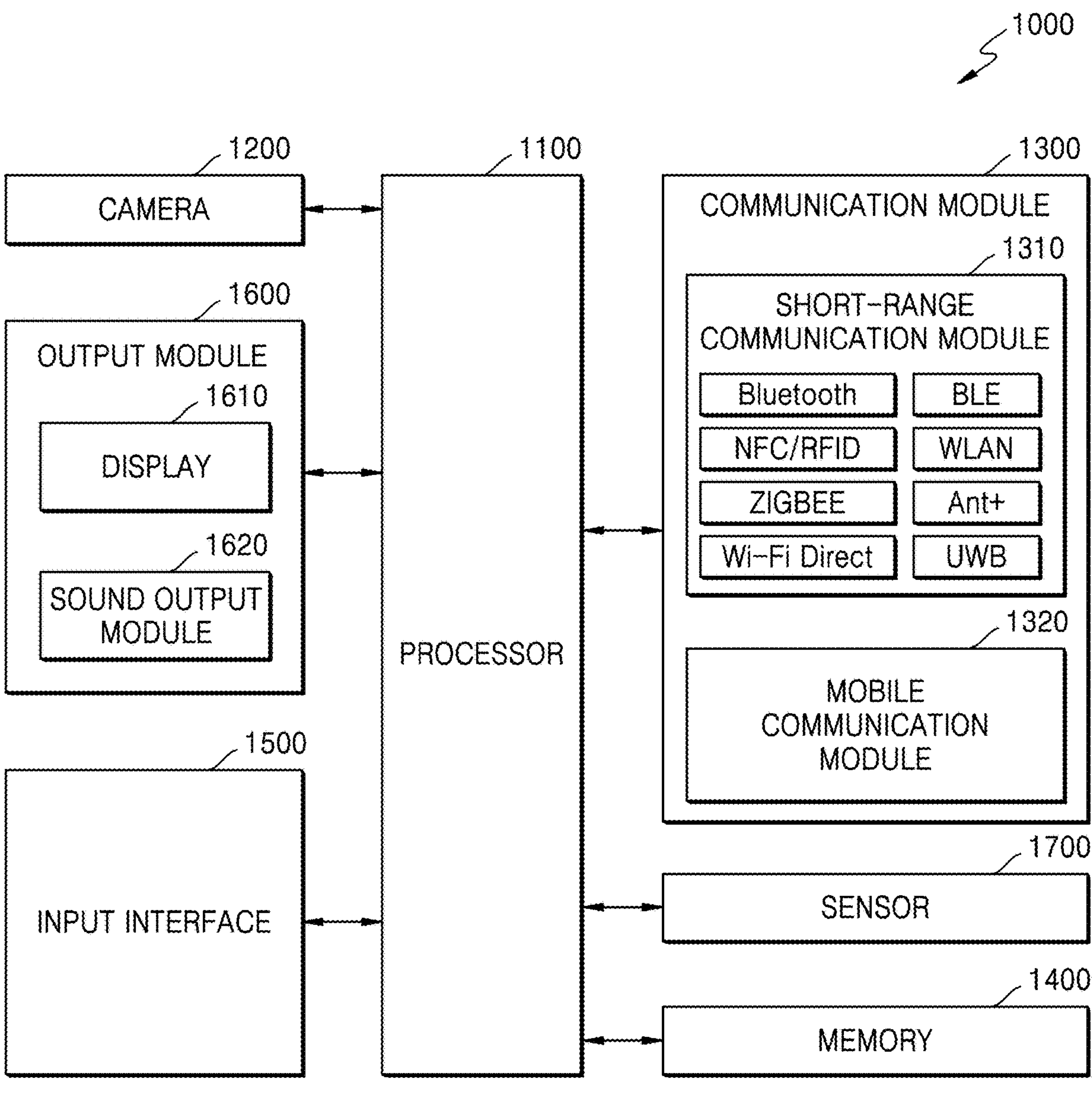
FIG. 16 is a block diagram of an electronic apparatus, according to another embodiment of the present disclosure.

FIG. 16 is a block diagram of an electronic apparatus according to another embodiment of the present disclosure.

Referring to FIG. 16, the electronic apparatus 1000 may include a camera 1200, a communication module 1300, a memory 1400, an input interface 1500, an output module 1600, a sensor 1700, and a processor 1100. The same components as those shown in FIG. 2 are assigned like reference numerals.

All the shown components may not be essential components of the electronic apparatus 1000. The electronic apparatus 1000 may be configured with more components than those shown in FIG. 16 or with less components than those shown in FIG. 16.

The output module 1600 may include a sound output module 1620 and a display 1610.

The sound output module 1620 may output a sound signal to outside of the electronic apparatus 1000. The sound output module 1620 may include, for example, a speaker or a receiver. The speaker may be used for general purposes, such as multimedia playback or recording playback.

The display 1610 may output image data subject to image-processing by an image processor (not shown) through a display panel (not shown), according to a control by the processor 1100. The display panel (not shown) may include at least one of a liquid crystal display, a thin film transistor-liquid crystal display, an organic light-emitting diode, a flexible display, a 3-Dimensional (3D) display, or an electrophoretic display.

The input interface 1500 may receive a user input for controlling the electronic apparatus 1000. The input interface 1500 may receive the user input and transfer the user input to the processor 1100.

The input interface 1500 may include a user input electronic device including a touch panel that detects a user's touch, a button that receives a user's push operation, a wheel that receives a user's rotation operation, a keyboard, and a dome switch, although not limited thereto.

Also, the input interface 1500 may include a voice recognition device (not shown) for voice recognition. For example, the voice recognition apparatus may be a microphone (not shown), and the voice recognition device may receive a user's voice command or a user's voice request. Accordingly, the processor 1100 may perform a control of performing an operation corresponding to a voice command or a voice request.

The memory 1400 may store various information, data, instructions, programs, etc. required for operations of the electronic apparatus 1000. The memory 1400 may include at least one of a volatile memory or a non-volatile memory, or a combination thereof. The memory 1400 may include at least one type of storage medium among a flash memory type, a hard disk type, a multimedia card micro type, card type memory (for example, Secure Digital (SD) memory or extreme Digital (XD) memory), random access memory (RAM), static random access memory (SRAM), read-only memory (ROM), electrically erasable programmable read-only memory (EEPROM), programmable read-only memory (PROM), magnetic memory, a magnetic disk, or an optical disk. Also, the electronic apparatus 1000 may manage a web storage or a cloud server that performs a storage function on the Internet.

The communication module 1300 may transmit/receive information to/from an external apparatus or an external server according to a protocol under a control by the processor 1100. The communication module 1300 may include at least one communication module and at least one port that transmits/receives data to/from an external apparatus (not shown).

Also, the communication module 1300 may perform communication with an external apparatus through at least one wired or wireless communication network. The communication module 1300 may include at least one of a short-range communication module 1310 or a mobile communication module 1320 or a combination thereof. The communication module 1300 may include at least one antenna for communicating with another apparatus in a wireless manner.

The short-range communication module 1310 may include at least one communication module (not shown) that performs communication according to communication standards, such as Bluetooth, Wireless Fidelity (Wi-Fi), BLE, NFC/Radio Frequency Identification (RFID), Wifi Direct, UWB, or ZIGBEE. Also, the mobile communication module 1320 may include a communication module that performs communication through a network for internet communication. Also, the mobile communication module 1320 may include a mobile communication module that performs communication according to communication standards, such as 3-Generation (3G), 4-Generation (4G), 5-Generation (5G), and/or 6-Generation (6G).

Also, the communication module 1300 may include a communication module capable of receiving a control command from a remote controller (not shown) located within a short distance, for example, an infrared (IR) communication module.

The sensor 1700 may include various kinds of sensors. For example, the sensor 1700 may include various kinds of sensors, such as an image sensor, an infrared sensor, an ultrasonic sensor, a lidar sensor, a human detection sensor, a motion detection sensor, a proximity sensor, and an illumination sensor. Because a function of each sensor may be intuitively deduced by a person skilled in the art from the name, detailed descriptions thereof will be omitted.

The processor 1100 may control overall operations of the electronic apparatus 1000. The processor 1100 may execute a program stored in the memory 14000 to control components of the electronic apparatus 1000.

According to an embodiment, the processor 1100 may include a Neural Processing Unit (NPU) for performing operations of a machine learning model. Also, the processor 1100 may include a central processing unit (CPU), a graphic processing unit (GPU), etc.

Machine-readable storage media may be provided in the form of non-transitory storage media. Herein, 'non-transitory storage media' means that the storage media do not include a signal and current and are tangible, without meaning that data is semi-permanently or temporarily stored in the storage media. For example, 'non-transitory storage media' may include a butter in which data is temporarily stored.

According to an embodiment, the method according to various embodiments disclosed in the present document may be included in a computer program product and provided. The computer program product may be traded between a seller and a purchaser. The computer program product may be distributed in the form of a machine-readable storage medium (for example, compact disc read only memory (CD-ROM)), or be distributed (for example, downloadable or uploadable) online via an application store or between two user devices (for example, smart phones) directly. When distributed online, at least part of the computer program product (for example, downloadable app) may be temporarily generated or at least temporarily stored in the machine-readable storage medium, such as a memory of the manufacturer's server, a server of the application store, or a relay server.

The invention claimed is:

1. An electronic apparatus comprising:
an input interface;
a display;
a communication module;
a memory to store at least one instruction; and
at least one processor, connected to the memory, to execute the at least one instruction to:
receive a user input of inputting a first cooking element and a second cooking element through the input interface,
send a request for at least one recommended cooking element to a server, through the communication module, based on a user input of selecting a cooking element type related to the first cooking element and the second cooking element among a plurality of cooking elements belonging to the selected cooking element type, the server having stored therein recipe information according to a recipe storage format,
receive the at least one recommended cooking element which is set as being associated with the selected cooking element type, from the server, the at least one recommended cooking element being set as associated based on information about a relevance between the first cooking element and the plurality of cooking elements belonging to the selected cooking element type and information about a relevance between the second cooking element and the plurality of cooking elements belonging to the selected cooking element type,
display identification information of the at least one recommended cooking element according to a recommendation order, through the display,
receive a user input of selecting one of the at least one recommended cooking element as a third cooking element, through the input interface, and
store the selected third cooking element as recipe information, together with the first cooking element and the second cooking element, in the memory.

2. The electronic apparatus of claim 1, wherein
the cooking element type is at least one of a cooking material type, a cooking method type, or a cooking tool type, and
the at least one processor is further configured to:
store the selected cooking element type as a cooking element type of the third cooking element in the memory.

3. The electronic apparatus of claim 1, wherein the at least one processor is further configured to:
calculate, according to the user input of selecting the one of the at least one recommended cooking element as the third cooking element through the input interface, a relevance between the first cooking element, the second cooking element, and the third cooking element, and transmit the calculated relevance to the server.

4. The electronic apparatus of claim 1, wherein a cooking element type of the first cooking element is a cooking material type, and
the at least one processor is further configured to:
obtain the first cooking element from a cooking name.

5. The electronic apparatus of claim 1, wherein the at least one recommended cooking element is set as being associated by applying a first weight to the information about the relevance between the first cooking element and the plurality of cooking elements belonging to the selected cooking element type, and applying a second weight that is different from the first weight to the information about the relevance between the second cooking element and the plurality of cooking elements belonging to the selected cooking element type.

6. The electronic apparatus of claim 1, wherein the at least one processor is further configured to control the display to:
display, through the display, a first menu for selecting at least one of a plurality of cooking materials, a second menu for selecting at least one of a plurality of cooking methods, and a third menu for selecting at least one of a plurality of cooking tools, and
display at least one recipe including cooking elements input through the first menu, the second menu, and the third menu among a plurality of recipes stored in the server.

7. The electronic apparatus of claim 1, wherein
the recipe information in the server includes a plurality of recipes including a plurality of pieces of single cooking operation data, and
the at least one processor is further configured to control the display to:
display a menu for inputting two or more single cooking operations through the display, and
display at least one recipe including two or more input single cooking operations among the plurality of recipes stored in the server.

8. The electronic apparatus of claim 7, wherein
the at least one processor is further configured to:
identify a cooking tool from a cooking element in the recipe information, set a cooking apparatus corresponding to the cooking tool among at least one cooking apparatus that is controllable by the electronic apparatus,
generate control information based on the recipe information, and
transmit the generated control information to the cooking apparatus.

9. The electronic apparatus of claim 8, wherein
the at least one processor is further configured to:
control the display to display the identification information of the set cooking apparatus and a user interface (UI) object for driving the cooking apparatus, together with the recipe information, and
transmit, according to reception of a user input of driving the cooking apparatus through the UI object, the generated control information to the cooking apparatus.

10. The electronic apparatus of claim 9, wherein the at least one processor is further configured to:
receive, according to transmission of the control information to the cooking apparatus, state information of the cooking apparatus from the cooking apparatus, and
control the display to display the received state information together with the recipe information.

11. A method of providing a guidance about a recipe, the method comprising:
receiving a user input of inputting a first cooking element and a second cooking element;
sending a request for at least one recommended cooking element to a server, based on a user input of selecting a cooking element type related to the first cooking element and the second cooking element among a plurality of cooking elements belonging to the selected cooking element type, the server having stored therein recipe information according to a recipe storage format;
receiving, from the server, the at least one recommended cooking element which is set as being associated with the selected cooking element type, the at least one recommended cooking element being set as associated based on information about a relevance between the first cooking element and the plurality of cooking elements belonging to the selected cooking element type and information about a relevance between the second cooking element and the plurality of cooking elements belonging to the selected cooking element type;
displaying identification information of the at least one recommended cooking element according to a recommendation order;
receiving a user input of selecting one of the at least one recommended cooking element as a third cooking element; and
storing the selected third cooking element as recipe information together with the first cooking element and the second cooking element.

12. The method of claim 11, wherein
the cooking element type is at least one of a cooking material type, a cooking method type, or a cooking tool type, and
the storing of the selected third cooking element as the recipe information together with the first cooking element and the second cooking element includes
storing the selected cooking element type as a cooking element type of the third cooking element.

13. The method of claim 11, further comprising:
calculating a relevance between the first cooking element, the second cooking element, and the third cooking element, and transmitting the calculated relevance to the server.

14. The method of claim 11, wherein a cooking element type of the first cooking element is a cooking material type,
the method further comprises
obtaining the first cooking element from a cooking name.

15. The method of claim 11, wherein
the at least one recommended cooking element is set as being associated by applying a first weight to the information about the relevance between the first cooking element and the plurality of cooking elements belonging to the selected cooking element type, and applying a second weight that is different from the first weight to the information about the relevance between the second cooking element and the plurality of cooking elements belonging to the selected cooking element type.

* * * * *